US007268456B2

(12) United States Patent
Harada et al.

(10) Patent No.: US 7,268,456 B2
(45) Date of Patent: Sep. 11, 2007

(54) STATOR OF ROTARY ELECTRIC MACHINE

(75) Inventors: Kenji Harada, Nishikamo-gun (JP); Toshiaki Katsu, Toyota (JP); Ryoji Mizutani, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/988,694

(22) Filed: Nov. 16, 2004

(65) Prior Publication Data

US 2005/0108870 A1    May 26, 2005

(30) Foreign Application Priority Data

Nov. 20, 2003    (JP)    ............... 2003-391181

(51) Int. Cl.
H02K 3/04    (2006.01)
(52) U.S. Cl. ....................... 310/201; 310/208
(58) Field of Classification Search ......... 310/201–208
See application file for complete search history.

(56) References Cited

U.S. PATENT DOCUMENTS

| 491,567 | A | * | 2/1893 | Kolben | 310/208 |
| 2,407,935 | A | * | 9/1946 | Perfetti et al. | 310/201 |
| 2,412,851 | A | * | 12/1946 | Wieseman | 310/208 |
| 4,339,681 | A | * | 7/1982 | Bogner et al. | 310/201 |
| 5,097,167 | A | * | 3/1992 | Kanayama et al. | 310/201 |
| 5,422,526 | A | * | 6/1995 | Kawabata et al. | 310/201 |
| 5,757,100 | A | * | 5/1998 | Burgbacher | 310/186 |
| 5,804,902 | A | * | 9/1998 | Hill | 310/179 |
| 6,137,201 | A | * | 10/2000 | Umeda et al. | 310/179 |
| 6,252,327 | B1 | * | 6/2001 | Matsuzaki | 310/201 |
| 6,445,102 | B1 | * | 9/2002 | Grundl et al. | 310/201 |
| 6,548,933 | B2 | * | 4/2003 | Yasuhara et al. | 310/203 |
| 6,791,227 | B2 | * | 9/2004 | Yasuhara et al. | 310/201 |
| 2002/0053853 | A1 | * | 5/2002 | Nishimura | 310/201 |
| 2004/0046475 | A1 | * | 3/2004 | Holzheu et al. | 310/201 |

FOREIGN PATENT DOCUMENTS

| JP | A 2000-156943 | 6/2000 |
| JP | A 2001-292548 | 10/2001 |
| JP | A 2002-153002 | 5/2002 |

* cited by examiner

Primary Examiner—Dang Le
(74) Attorney, Agent, or Firm—Kenyon & Kenyon LLP

(57) ABSTRACT

There is provided a stator of a rotary electric machine in which the proportion of the cross sectional area of a coil in the cross sectional area of the slot is high, and an electric power loss due to leakage flux can be reduced. The stator is a stator of a rotary electric machine including a stator and a rotor. The stator includes a stator core having multiple slots in a direction parallel to a rotational axis of the rotary electric machine, and a laminated flat-body conductor which is formed, in a press process, by laminating a predetermined number of flat-body conductors each of which has a predetermined shape. According to the predetermined shape, the flat-plate conductor has an open end portion such that the flat-plate conductor can be fitted in the stator core. The laminated flat-body conductor is inserted in the slots of the stator core, and the open end portion of the laminated flat-plate conductor is closed, whereby a coil is formed.

13 Claims, 22 Drawing Sheets

F I G. 3A
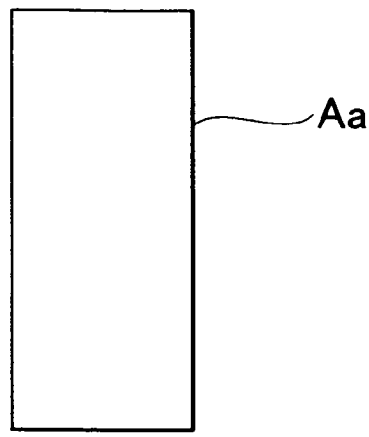
F I G. 3B
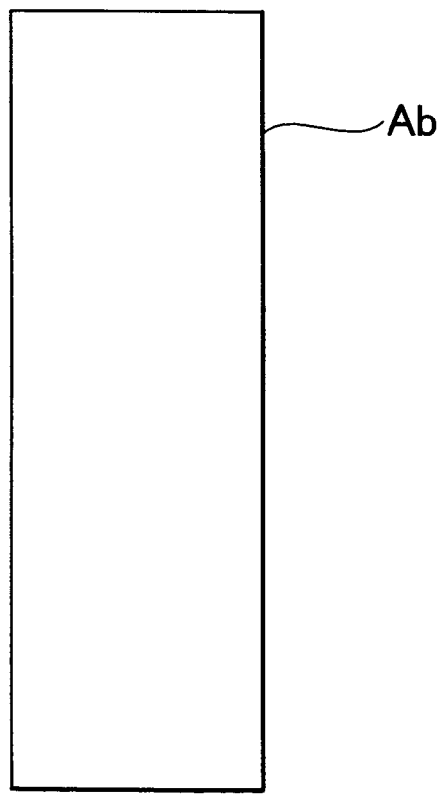

WIDTH OF TOOTH   WIDTH OF SLOT

STATOR OF ROTARY ELECTRIC MACHINE

INCORPORATION BY REFERENCE

The disclosure of Japanese Patent Application No. 2003-391181 filed on Nov. 20, 2003, including the specification, drawings and abstract is incorporated herein by reference in its entirety.

BACKGROUND OF THE INVENTION

1. Field of the Invention

The invention relates to a structure of a rotary electric machine including a stator and a rotor. More particularly, the invention relates to a structure of a stator.

2. Description of the Related Art

Conventionally, as a stator of a rotary electric machine including a stator and a rotor (e.g., a synchronous motor), a stator of a rotary electric machine has been employed in which a nozzle is inserted into a slot, that is formed between teeth arranged in a stator core, from the inner peripheral side, that is, the side on which there is the axis of rotation of the synchronous motor, and a coil is wound around each of the teeth multiple times (this method is so-called nozzle direct winding). The nozzle direct winding for the stator core provides robustness and is low in cost.

Also, for a stator of a rotary electric machine, a structure is employed in which an electromagnetic member (i.e., a coil) is fitted to the stator having a continuous inner periphery at a portion between teeth and the electromagnetic member is fixed, whereby a proportion of a cross sectional area of the coil in a cross sectional area of the slot is increased. Examples of art related to a stator of a rotary electric machine having the above-mentioned structure are disclosed in the following publications.

Japanese Patent Laid-Open Publication No. 2000-156943 discloses a highly efficient and compact stator of a rotary electric machine, which is applicable to multi-phase alternating winding and concentrated winding. This stator of a rotary electric machine includes tooth cores; a stator winding provided at a portion between adjacent tooth cores on the inner peripheral side, that is, the side on which there is the axis of rotation of the rotary electric machine; and core-back cores each of which is provided at a portion between the adjacent tooth cores on the outer peripheral side, that is, the outer side of the rotary electric machine. In this stator, the tooth core includes a bridge which continuously connects an end portion of the tooth core on the inner peripheral side to an end portion of an adjacent tooth core on the inner peripheral side.

In the stator of a rotary electric machine disclosed in the above publication, the stator core is divided into a tooth core portion and a core-back core portion. After a stator winding is fitted to a slot portion between the tooth core portions, the core-back core portion is pressed into a portion between the tooth core portions in a radial direction. It is therefore possible to provide the stator core which is applicable to multi-phase alternating winding and concentrated winding, and which can increase the proportion of the cross sectional area of the coil in the cross sectional area of the slot, thereby reducing a copper loss.

Other than this structure, there are examples of a structure of a stator core which is divided into two parts. The examples are a structure in which a single coil, that is wound around a bobbin, is fitted to the stator separately from the stator core; a structure in which, in a division motor obtained by dividing the stator core, teeth are coupled to each other while the width of the coupling remains small, the teeth are deployed in the circumferential direction, and windings are fitted to three slot portions of the stator simultaneously using three nozzles, whereby productivity is increased and cost reduction is realized; a structure in which windings are wound around the teeth, that are not coupled to each other, by spindle winding using multiple rotational axes, and the like.

Meanwhile, examples of related art of a stator of a rotary electric machine using a U-shaped coil are disclosed in the following publications.

Japanese Patent Laid-Open Publication No. 2001-292548 discloses a stator of a rotary electric machine, in which the length of a coil end portion is considerably reduced. In this stator of a rotary electric machine, stator coils are fitted to multiple slots of a stator core. In this stator, a straight wire constituting a coil is formed in a U-shape in advance. Then, two straight portions are inserted in slots adjacent to each other through a tooth portion of the stator. Then, a coil constituting a one-turn closed circuit is formed by connecting both ends of the U-shaped coil using a thin plate bar-like piece. By inserting such coils in plurality, a coil having a predetermined number of turns is formed. When the both ends of the U-shaped coil are connected to each other by overlapping the thin plate bar-like piece with the both ends, the thickness of a portion of each end, which overlaps with the thin plate bar-like piece, is reduced by half, and the thickness of a portion of the thin plate bar-like piece, which overlaps with the end, is reduced by half. Thus, the total thickness of the overlapping portion of the end and the overlapping portion of the thin plate bar-like piece corresponds to the thickness of the straight coil, when the end of the coil and the thin plate bar-like piece are overlapped with each other. The thickness of the left end of the coil is reduced by half at the surface toward the internal diameter of the stator. The coil is formed in advance such that the thickness of the right end of the coil is reduced by half at the surface toward the external diameter of the coil. Meanwhile, the thickness of the thin plate bar-like piece is reduced by half at the surface opposite to the surface of the coil at which the thickness of the end of the coil is reduced by half. When the coil and the thin plate bar-like piece are overlapped with each other, the coil and the thin plate bar-like piece are connected to each other such that two straight portions of the U-shaped coil sandwich the thin plate bar-like piece.

In the stator of a rotary electric machine disclosed in Japanese Patent Laid-Open Publication No. 2001-292548, a stride width of the coil is decided based on the width of the adjacent slot. Therefore, the length of a U-shaped portion which protrudes from the stator core in the axial direction corresponds to the width of the adjacent slot. Meanwhile, the portions of the coil, which protrude from the stator core at the side of the end portion of the coil, are connected to each other by the thin plate bar-like piece. Accordingly, only the width corresponding to the width of the thin plate bar-like piece is required in the axial direction. As a result, it is possible to provide the stator in which the length of the coil end portion is reliably reduced.

Japanese Patent Laid-Open Publication No. 2002-153002 discloses a stator of a rotary electric machine in which insulation performance and cooling capability of a coil are increased. This stator of a rotary electric machine includes a stator core; and a stator coil which is fitted to a slot of the stator core so as to be wound around a tooth portion of the stator core. The stator coil is formed by laminating U-shaped coils each of which is formed in a U-shape in advance. The stator coil is inserted into slots adjacent to each other through the tooth portion of the stator. The coil having a predetermined number of turns is obtained by connecting the end portion of the U-shaped coil to the end portion of the adjacent U-shaped coil.

In the stator of a rotary electric machine disclosed in the above publication, even when a coil in which winding tension become excessive, for example, a straight coil or a heavy line coil is used, an insulation member such as a bobbin is prevented from being damaged, a laminated and fastened tooth core is prevented from being deformed, and the coil is prevented from being damaged. As a result, the insulation performance of the coil can be increased. Also, it is not necessary to increase the thickness of the bobbin in order to prevent the bobbin from being damaged. Accordingly, heat conductivity of the bobbin is not reduced. As a result, the cooling ability of a high-temperature coil can be increased.

However, when a coil is directly fitted to a stator of a rotary electric machine by a nozzle, as shown in FIG. 22, a nozzle 300 enters a slot 304 of a stator core 302. The nozzle 300 winds a copper wire around a tooth 308 formed between a slot 304 and a slot 310 so as to form a coil 306. In such a structure, there is a problem that a space for winding is occupied by the nozzle by the size of the nozzle 300, and the proportion of the cross sectional area of the winding in the cross sectional area of the slot cannot be increased. Japanese Patent Laid-Open Publication No. 2001-292548 and Japanese Patent Laid-Open Publication No. 2002-153002 do not disclose a technology for solving this problem.

Also, in the technology disclosed in Japanese Patent Laid-Open Publication No. 2000-156943, the tip portions of the teeth on the inner periphery are coupled to each other in order to reduce the number of divisions of the core. However, there is a problem that the die life is reduced since the width of coupling is small. Also, there is a problem that, since the core, whose inner periphery is divided into multiple portions, leaks the magnetic flux of both the coil and a magnet, the size of the core is increased. Further, there is a problem that an iron loss is increased excessively since ineffective leakage flux circulates in the core whose inner periphery is divided into multiple portions. Namely, an over current is generated due to the leakage flux, and an electric power loss is caused due to the over current. Also, a stress for fixation is applied due to caulking after annealing of the core, which causes a problem that an iron loss is increased.

Meanwhile, when part of the teeth are coupled to each other while the width of coupling remains small, after winding is fitted to the deployed core, the joints are welded, or caulking is performed using another member on the outer periphery, when the teeth are arranged in a circle. At this time, the entire iron loss deteriorates by 30% by creating a high level of distortion in iron (an electromagnetic steel plate).

Also, according to the relationship among heat capacity, amount of generated heat and amount of released heat, the relation being represented by current density, generally, heat is most likely to be generated in the coil end portion when a high load is applied. Therefore, this fact needs to be taken into consideration when the size of the motor is decided.

SUMMARY OF THE INVENTION

According to an embodiment of the invention, there is provided a stator of a rotary electric machine including a stator core having multiple slots in a direction parallel to a rotational axis of the rotary electric machine; and a laminated flat-plate conductor formed by laminating a predetermined number of flat-plate conductors each of which has an open end portion that opens such that the flat-plate conductor can be fitted to the stator core. The laminated flat-plate conductor is inserted into the slots of the stator core and the open end portion thereof is closed, whereby a coil is formed.

With this structure, in the stator of a rotary electric machine (e.g., a synchronous motor) including a stator and a rotor, the stator includes the stator core having multiple slots; and the laminated flat-plate conductor (e.g., a laminated body coil) formed by laminating the predetermined number of flat-plate conductors (e.g., rolled copper material) each of which has a shape that opens such that the flat-plate conductor can be fitted to the stator core (e.g., a U-shape). The laminated flat-plate conductor can be fitted to the slots of the stator core so as to stride a tooth portion between the slots. After the laminated flat-plate conductor is fitted to the slots, the open end portion thereof is closed, whereby the coil is formed. Since such a laminated flat-plate conductor is formed, it is not necessary to obtain a space for winding, which corresponds to a size of the nozzle that is necessary when the coil is wound around the tooth directly by the nozzle. It is therefore possible to freely set the cross section of the laminated flat-plate conductor that is to be inserted into the slots. Namely, it is possible to set the cross section of the laminated flat-plate conductor such that the proportion of the cross sectional area of the laminated flat-plate conductor in the cross sectional area of the slot becomes high. Thus, a copper loss can be reduced. As a result, the efficiency can be increased. Further, the sizes of the stator core and the coil end portion can be reduced.

An over-current loss due to an over-current generated by leakage flux is likely to increase as the thickness of the flat-plate conductor through which an electric current flows increases. Therefore, in the laminated flat-plate conductor, by laminating multiple flat-plate conductors, an electric current is divided and flows in each turn of the flat-plate conductors constituting the laminated flat-plate conductor. Accordingly, an over-current loss can be reduced. Also, an electric power loss due to leakage flux can be reduced by reduction of an over-current loss. It is thus possible to provide a stator of a rotary electric machine in which the proportion of the cross sectional area of the coil in the cross sectional area of the slot is high, and an electric power loss due to leakage flux can be reduced.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIGS. 3A and 3B are views showing cross sectional areas of the laminated body coil according to the first embodiment;

DETAILED DESCRIPTION OF THE PREFERRED EMBODIMENTS

Figure 1:
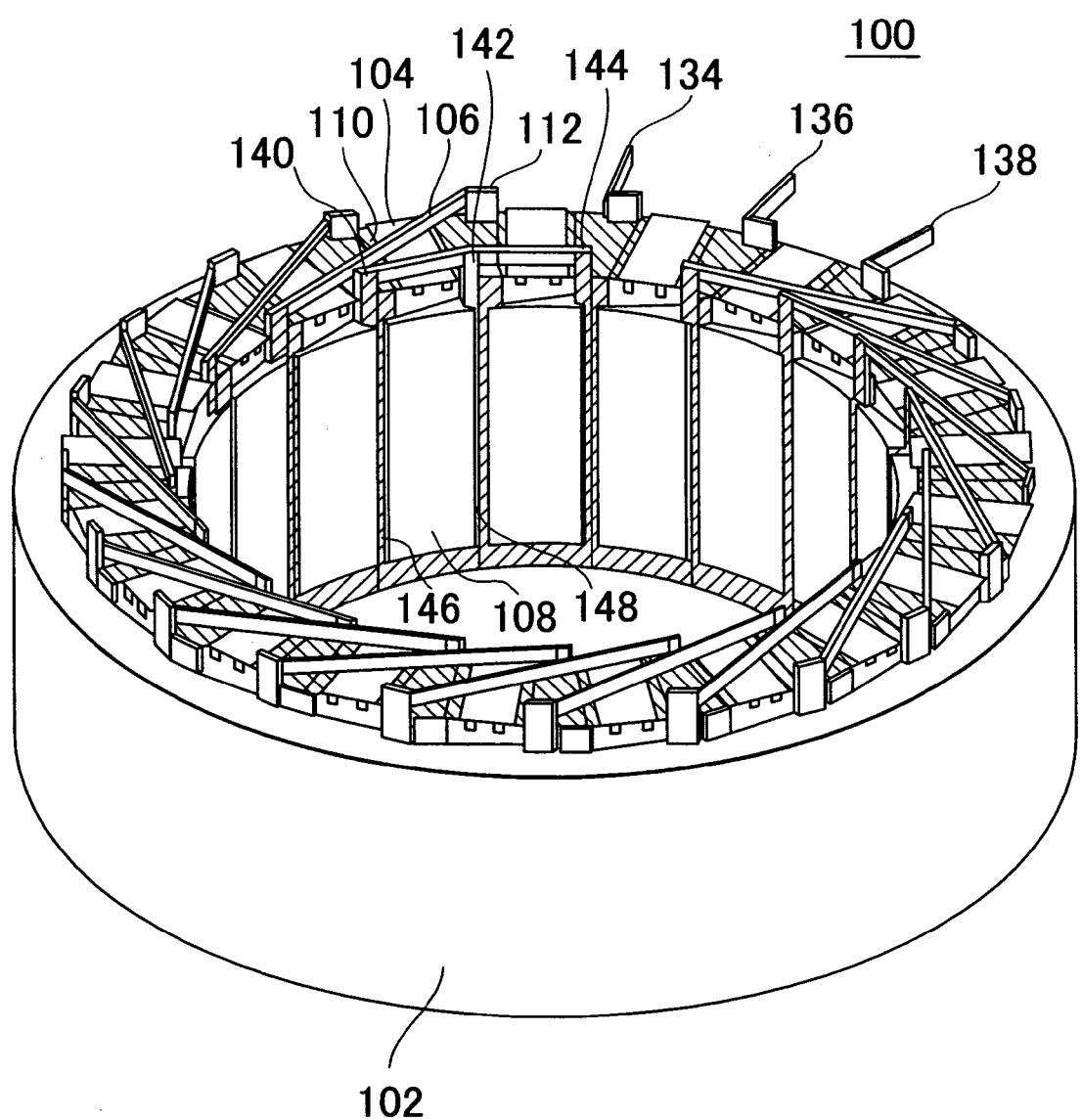
FIG. 1 is a view showing a stator according to a first embodiment of the invention.

Hereafter, a stator of a rotary electric machine according to an embodiment of the invention will be described with reference to accompanying drawings. In the following description, a stator of a synchronous motor is taken as an example. In the following description, the same reference numerals are assigned to the same elements. The names and functions of the elements having the same reference numerals are also the same. Therefore, concrete descriptions on the elements having the same reference numerals are made only once and not repeated.

Hereafter, a first embodiment will be described in detail.

A stator according to the first embodiment is a stator of a synchronous motor provided with a stator and a rotor including a permanent magnet. As shown in FIG. 1, a stator 100 includes a stator core 102, a coil 112, a bus bar 110, a bus bar positioning block 104, and a crossover member 106.

The stator core 102 is formed by laminating multiple electromagnetic steel plates, and has a hollow cylindrical shape. The stator core 102 has a predetermined number of grooves (hereinafter, referred to as "slots") in a direction parallel to the rotational axis of the synchronous motor. The number of the slots corresponds to the number of poles. The number of poles is not particularly limited. In the embodiment, the number of poles is, for example, "21". A tooth portion (hereinafter, simply referred to as a "tooth" when concerning one tooth, and referred to as "teeth" when concerning multiple teeth) 108 is provided between the slots. The number of teeth also corresponds to the number of poles, as the number of the slots corresponds to the number of poles. Therefore, in the embodiment, in the stator core 102 having 21 poles, 21 slots are formed between 21 teeth, alternately.

A laminated body coil (not shown) is wound around the tooth 108, that is, the laminated body coil is inserted into the slots formed on the both sides of the tooth 108 in the direction parallel to the rotational axis of the synchronous motor such that the laminated body coil strides the tooth 108. The laminated body coil is a laminated flat-plate conductor formed by laminating a predetermined number of flat-plate conductors each of which has a predetermined shape, that is, each of which has an open end portion that opens such that the coil can be fitted to the tooth. The shape of the flat-plate conductor is not particularly limited. Hereafter, description of the embodiment will be made on the assumption that the flat-plate conductor is, for example, a metal flat-plate of a conductor. In the slots on both sides of the tooth 108, multiple laminated body coils are inserted in the radial direction of the synchronous motor. The number of the laminated body coils to be inserted is not particularly limited. For example, in the embodiment, ten laminated body coils are inserted in the slots in the radial direction so as to stride the tooth 108.

An end portion of the laminated body coil is connected to a joint portion of the bus bar 110 which is a straight conductor. At this time, one of the end portions of the bus bar 110 is connected to one of the end portions of the laminated body coil, respective The other end portion of the bus bar 110 is connected to one of the end portions of the adjacent laminated body coil. Similarly, one of the end portions of each of the ten laminated body coils is connected to one of the end portions of the adjacent laminated body coil, respectively. Thus, the coil is wound around the tooth 108 ten times. Namely, by closing the open end portion of the laminated body coil, the coil 112 having ten turns is formed.

In the tooth 108, multiple bus bars, which is used for connecting the end portions of the multiple laminated body coils to each other, are positioned. The positioned bus bars are fixed by the bus bar positioning block 104. By providing the bus bar positioning block 104 at a predetermined position and pressing the bus bars, the bus bars are fitted to the corresponding end portions of the multiple laminated body coils. These bus bars are connected to the end portions by processes such as laser welding and TIG (Tungsten Inert Gas arc) welding or the like.

When multiple bus bars are connected to the end portions and the laminated body coils are wound around the tooth 108, the coil 112 is formed. The coil 112 has coil terminal portions each of which is not connected to the bus bar. One of the coil terminal portions is in one of the slots on both sides of the tooth 108 and is on the inner peripheral side. The other coil terminal portion is in the other slot and is on the outer peripheral side. Each of the coil terminal portions is connected to a coil wound around another tooth by the crossover member 106. Similarly, a coil having ten turns is wound around each of the other teeth included in the stator core 102. The coils wound around the teeth are connected to each other, when the coil terminal portions are connected to each other by the crossover member for every three teeth. Then, coil terminal portions 140, 142, 144 are connected to each other by the crossover member. Thus, the stator 100 of a three phase synchronous motor is formed. By supplying an alternating current to each of coil terminal portions 134, 136, and 138 with the phase of the alternating current being controlled, a magnetic field is generated. The rotor of the synchronous motor obtains a rotational force based on the generated magnetic field.

The material of the metal flat-plates constituting the laminated body coil is, for example, rolled copper material, in the embodiment. By using the rolled copper material for the metal flat-plate, heat dissipation performance of the coil can be further increased, since copper has high heat conductivity. Also, copper has low internal resistance and high conductivity as a conductor. Therefore, the amount of generated heat when the current density is increased can be reduced. On the surface of the metal flat-plate made of the rolled copper material, surface treatment is performed using insulating coating of copper oxide.

Also, the metal flat-plate includes an open end portion, two members parallel to each other, and a connection end portion which connects the two members. In the embodiment, the laminated body coil is formed by laminating, for example, U-shaped metal flat-plates. Namely, the laminated body coil is formed by laminating metal flat-plates which are pressed into a U-shape in the press process. However, the shape into which the metal flat-plate is pressed is not limited to the U-shape.

Figure 2:
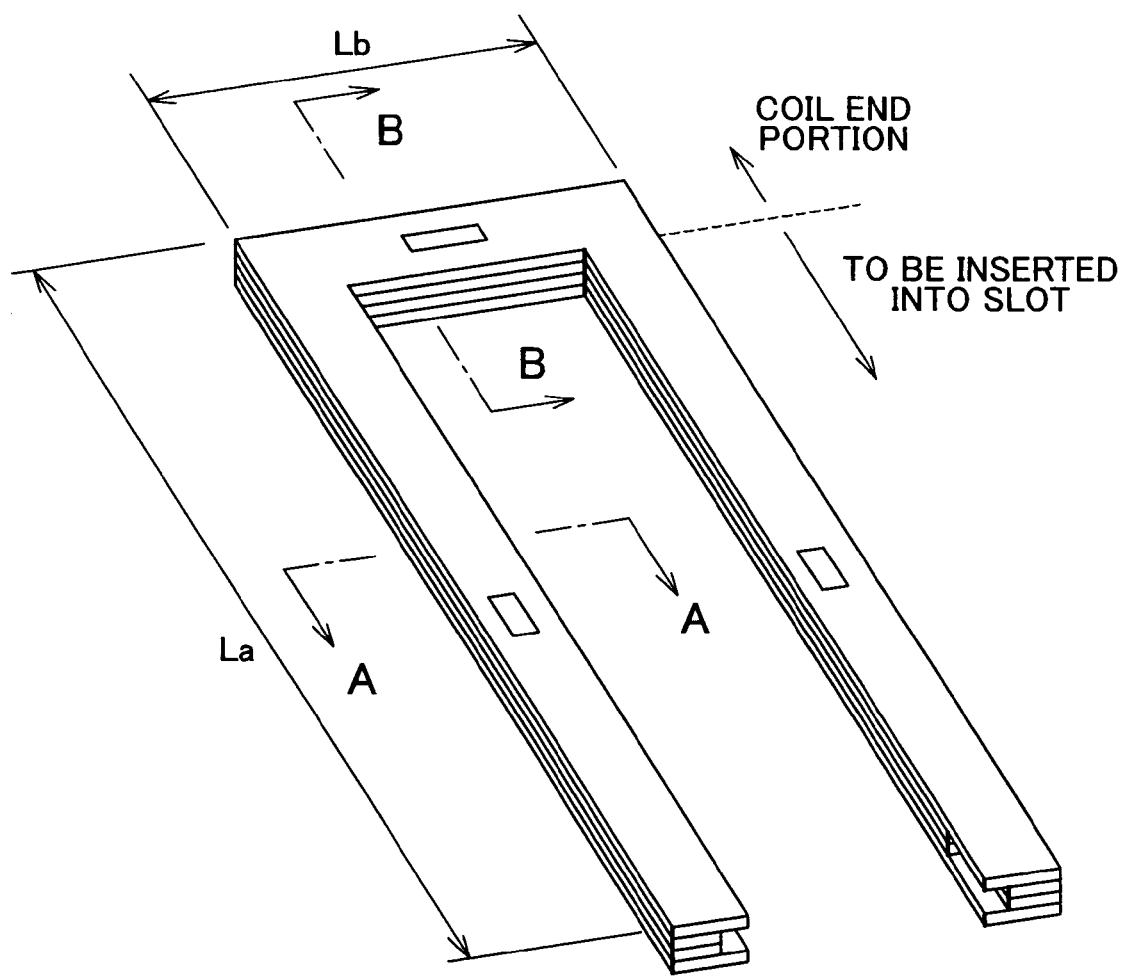
FIG. 2 is a view showing a U-shaped laminated body coil according to the first embodiment.

As shown in FIG. 2, a laminated body coil 114 according to the embodiment is formed by laminating multiple U-shaped metal flat-plates. At this time, the two members, which are parallel to each other, of the laminated body coil 114 are inserted into slots 146 and 148 on both side of the tooth 108, respectively. Also, the connection end portion, which connects the two members parallel to each other, forms a coil end portion. FIG. 3A shows a cross section of each of the two members parallel to each other. FIG. 3B shows a cross section of the connection end portion which forms the coil end portion. When FIG. 3A is compared with FIG. 3B, the cross sectional area of the connection end portion constituting the coil end portion is larger than the cross sectional area of each of the two members parallel to each other, which are to be inserted into the slots 146 and 148, respectively.

By employing such a structure, the volume of the coil constituting the coil end portion increases, compared with the case where the cross sectional area of the connection end portion is made equal to the cross sectional area of each of the two members parallel to each other. Thus, the heat capacity in the coil end portion is increased. The heat generated in the slot is transferred to the coil end portion in the same turn as the portion inserted in this slot. In this coil end portion, there is almost no heat resistance. As a result, the performance of heat dissipation from the coil in the slot to the coil end portion is increased. Accordingly, the current density can be increased in the coil in the slot having a small space. In addition, the size of the stator core 102 can be deduced by the amount of increase in the current density.

Hereafter, there will be described the principle based on which the current density in the slot is increased by making the cross sectional area of the connection end portion constituting the coil end portion larger than the cross sectional area of the portion to be inserted into the slot.

The heat rating of the coil in a short time is as follows. 1) The entire heat generated in the coil is used for increasing the temperatures of the coils. 2) In the coil, the temperature is constant. 3) Heat resistance in the laminated body coil in the same turn is sufficiently smaller than the heat dissipation resistance to the outside.

Here, an entire heat generation amount Q in the laminated body coil can be shown by "$Q=2\times($Ra (resistance in the two members parallel to each other)$+$Rb (resistance in the connection end portion of the laminated body coil 114)$\times I^2$ (current)$\times dt$ (electric power supply period). In the embodiment, $Q=\gamma$(copper specific heat)$\times \rho$ (copper density)$\times 2\times($Aa (cross sectional area of each of the two members parallel to each other)$\times$La (length of each of the two members parallel to each other)$+$Ab (cross sectional area of the connection end portion)$\times$Lb (length of the connection end portion)$\times dT$ (increase in the temperature). The lengths of the two members parallel to each others are the same.

Meanwhile, coil resistance R can be shown by "$R=2\times($Ra$+$Rb$)=2\times\alpha$(specific resistance)$\times($La$/$Aa$+$Lb$/$Ab$)$".

Namely, the entire heat generation amount Q in the laminated body coil is "$Q=2\times\alpha\times($La$/$Aa$+$Lb$/$Ab$)\times I^2\times dt=\gamma\times\rho\times 2\times($Aa$\times$La$+$Ab$\times$Lb$)\times dT$". Here, when the above equation is organized on the condition that "Lb$=$X$\times$La", and "Ab$=$Y$\times$Aa", $(I/Aa)^2=\gamma\times\rho\times\alpha\times(dT/dt)\times(X\times Y^2+Y)/(X+Y)$. Namely, in a common motor, the term on the right hand of the above-mentioned equation, that is, "$\gamma\times\rho\times\alpha\times(dT/dt)$", is a substantial equation when the cross sectional area of each of the two members parallel to each other on the slot side is the same as the cross sectional area of the connection end portion on the coil end side. Namely, a temperature increase dT in the rated time is proportional to the square of the current density (I/Aa). Also, the term of "$(X\times Y^2+Y)/(X+Y)$" should be taken into consideration, when the length and the cross sectional area of each of the two members parallel to each other on the slot side are different from the length and the cross sectional area of the connection end portion on the coil end side, respectively. For example, when the length Lb is 0.3 times of the length La (X=0.3) and also the cross sectional area Ab is three times of the cross sectional area Aa (Y=3), the term of "$(X\times Y^2+Y)/(X+Y)$" becomes "1.727", when this value "1.727" is converted into the current density (I/Aa), a value "$1.314(=\sqrt{1.727})$" is obtained. Namely, the current density (I/Aa) in the slot can be increased approximately 1.3 times in the same temperature condition. This signifies that the size of the stator core can be reduced by approximately 30%. Accordingly, in the laminated body coil 114, by making the cross sectional area of the connection end portion constituting the coil end portion larger than the cross sectional area of each of the two members parallel to each other which are to the inserted into the slots, the current density in the slot can be increased.

Also, the coil in the slot contacts the stator core 102. Therefore, by dissipating the heat, which is generated due to a copper loss, to the stator core, the temperature of the coil can be easily maintained at a low value. Meanwhile, the coil of the coil end portion is exposed to the air. Therefore, it is difficult to dissipate the heat, which is generated due to a copper loss, to the outside. In the embodiment, the shape of the metal flat-plate forming the coil end is a U-shape such that the coil end portion contacts the stator core 102. As a result, heat can be dissipated from the coil end portion to the stator core 102. Accordingly, the heat dissipation performance of the coil end portion can be increased. For example, when the slot is formed so as to be perpendicular to the end surface of the stator core, the inner angle between each of the two members parallel to each other and the connection end portion is a right angle. Thus, it is possible to make the metal flat-plate contact the stator core. For example, when the angle between the slot and the end surface of the stator core is a skew angle, the inside angel between each of the two members parallel to each other and the connection end portion is an angle corresponding to the skew angle. Therefore, it is possible to allow the metal flat-plate forming the coil end to contact the stator core.

Also, the length of the motor in the axial direction is defined by the sizes of the stator core and the coil end portion fitted to the stator core. Therefore, by forming the metal flat-plate and the laminated body coil in the U-shape, the proportion of the volume of the coil end portion can be increased. As a result, the size of the stator can be reduced.

As shown in FIG. 2, three protruding portions are provided in the U-shaped metal flat-plate. Each protruding portion is formed by combination of a convex portion and a concave portion which is formed on the backside of the convex portion. In a convex portion of the protruding portion of the metal flat-plate is pressed into a concave portion of the protruding portion of the adjacent metal flat plate. Thus, the convex portion of one metal flat-plate and the concave portion of the adjacent metal flat-plate are fixed to each other by so-called lamination caulking. The laminated body coil 114 is thus formed. When the metal flat-plates are fixed to each other, it is possible to carry each laminated body. As a result, workability is increased when the laminated body coil 114 is fitted to the stator. The number of metal flat-plates to be laminated is not particularly limited. In the embodiment, the laminated body coil 114 is formed by laminating tree or four metal flat-plates.

Figure 4A:
FIGS. 4A to 4D are views showing cross sectional areas of the laminated body coil in a direction in which the coils are laminated, according to the first embodiment.
Figure 4B:
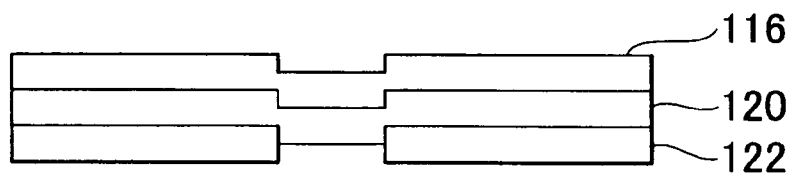
Figure 4C:
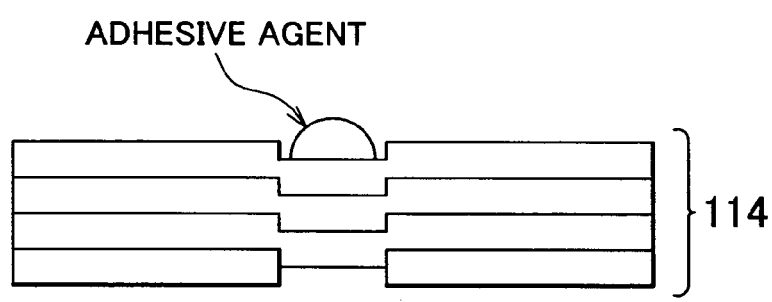

FIG. 4A is a cross section of a U-shaped metal flat-plate 116 including a protruding portion, when viewed in the direction in which the metal flat-plates are laminated. Then, as shown in FIG. 4B; the protruding portion of the metal flat-plate 116 is pressed into a concave portion of a metal flat-plate 120 by lamination caulking. Further, a protruding portion of the metal flat-plate 120 is pressed into a hole portion formed in an adjacent metal flat-plate 122, whereby the metal flat-plates 116, 120 and 122 are fixed to each other. Thus, the laminated body coil 114 shown in FIG. 4C is formed.

Figure 4D:
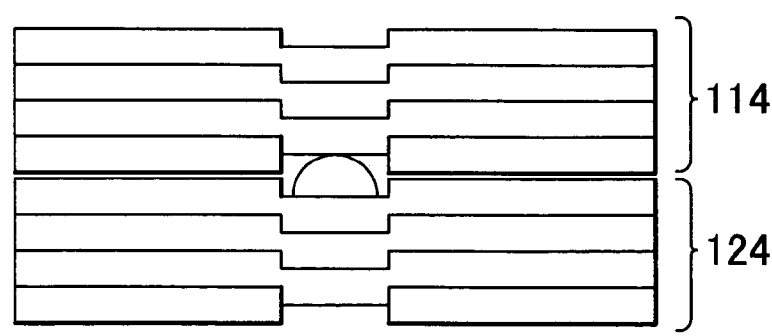

Also, the adjacent laminated body coils may be fixed to each other using an adhesive agent. Namely, by using the concave portion, which is the backside of the protruding portion of the metal flat-plate, as a receiver for the adhesive agent, and applying the adhesive agent to the concave portion, the laminated body coil 114 may adhere to the adjacent laminated body coil 124, as shown in FIG. 4D. When the laminated body coils are made adhere to each other, a caulked portion may be used as the receiver for the adhesive agent. Thus, workability when the coils are fitted to the stator core can be increased.

Hereafter, the process, in which the stator 100 is formed from the rolled copper material, will be described based on the structure of the stator 100.

Figure 5:
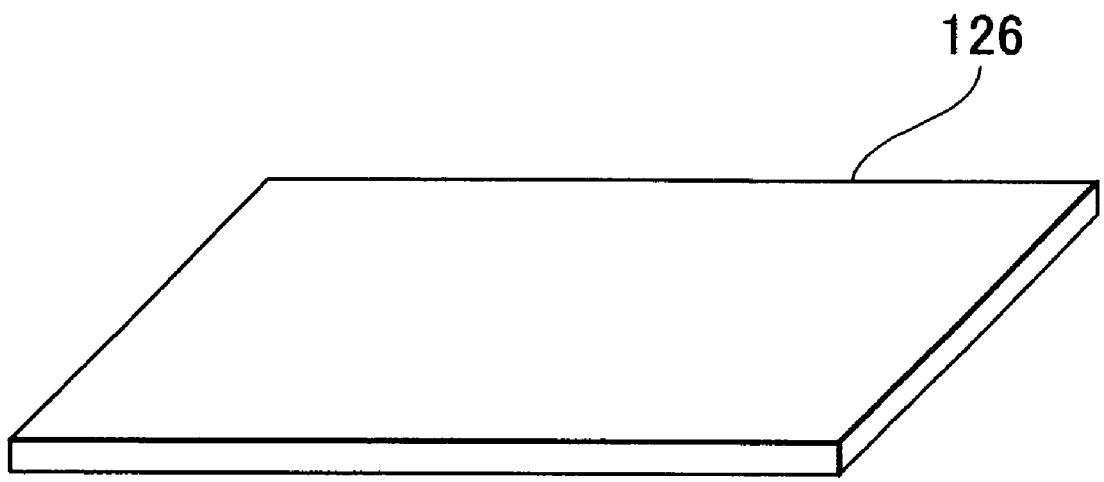
FIG. 5 is a view showing a metal flat-plate made of rolled copper material, according to the first embodiment.
Figure 6:
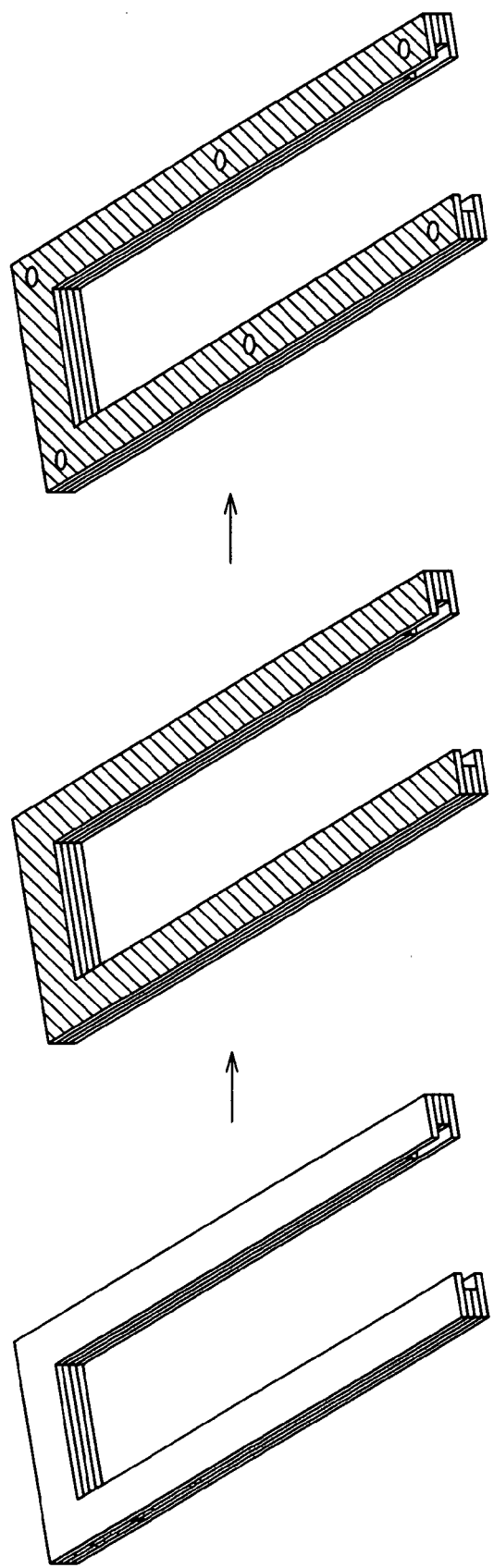
FIGS. 6A to 6C are views showing a procedure of an insulating process for the laminated body coil, according to the first embodiment.

FIG. 5 is a view showing a metal flat-plate 126 made of rolled copper material. On the surface of the metal flat-plate 126 made of rolled copper material, surface treatment is performed using insulating coating of copper oxide. In the press process, the metal flat-plate 126 made of rolled copper material is pressed into a U-shape. A predetermined number of the metal flat-plates formed into the U-shape are laminated, as shown in FIGS. 4A to 4D. By fixing the metal flat-plates by lamination caulking, the laminated body coil 114 is formed as shown in FIG. 6A. As shown in FIG. 6B, in the laminated body coil 114, a process for realizing insulation from the adjacent laminated body coil is performed. Means for realizing insulation from the adjacent coil is not particularly limited. For example, inorganic material such as glass may be interposed between the adjacent laminated body coils, or enamel treatment may be performed for each laminated body. As shown in FIG. 6C, the laminated body coil 114 may adhere to another laminated body coil by applying an adhesive agent on an insulation body at a predetermined position. Alternatively, as shown in FIG. 4D, the concave portion, which is the back side of the protruding portion of the laminated body coil, may be used as receiver for the adhesive agent.

Figure 7:
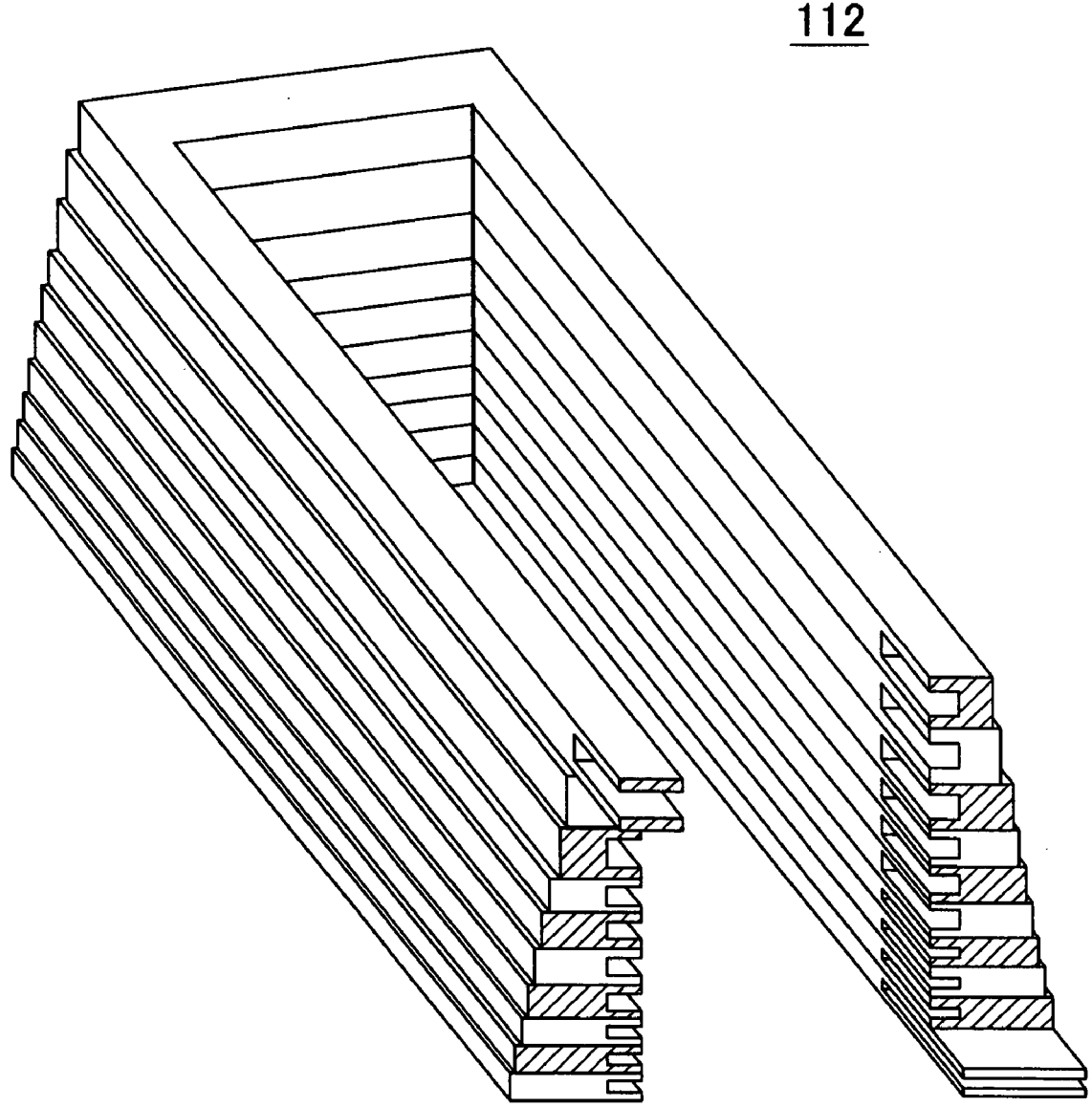
FIG. 7 is a view showing a coil formed of multiple laminated body coils, according to the first embodiment.

By allowing multiple laminated body coils to adhere to each other with insulation bodies interposed therebetween, as shown in FIG. 7, the coil 112 is formed. At this time, the U-shaped metal flat-plates are laminated such that laminated body coils constituting the coil 112 are different in size. By employing such a structure, the cross section of the laminated body coil, which is to be inserted into the slot, can be set freely. In the embodiment, the width of the U-shaped metal flat-plate to be inserted in the slots becomes larger from the inner peripheral side toward the outer peripheral side in the radial direction of the synchronous motor (in FIG. 7, from the upper portion to the bottom portion) according to the shape of the slot. By employing such a structure, the proportion of the cross sectional area of the coil 112 in the cross sectional area of the slot is increased.

Figure 8:
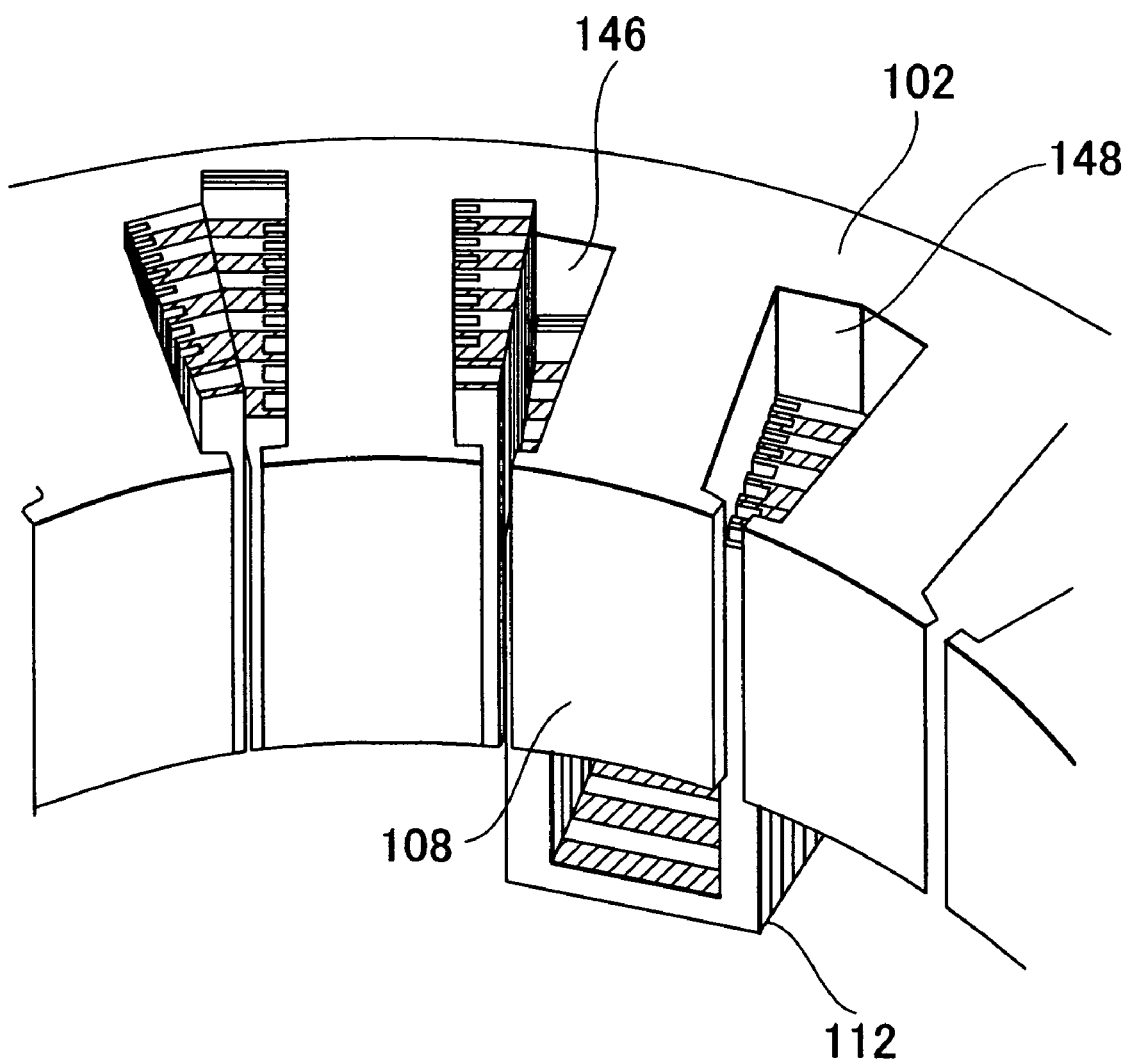
FIG. 8 is a view showing a procedure of insertion of the coil into a stator core, according to the first embodiment.

A shown in FIG. 8, the coil 112 formed of multiple laminated body coils is inserted into the stator core 102 so as to stride the tooth 108 of the stator core 102. Namely, the end portions corresponding to the two members of the coil 112, which are parallel to each other, are inserted in the slots 146 and 148 on both sides of the slot of the tooth 108, respectively, in the direction parallel to the rotational axis of the synchronous motor.

As shown in FIG. 7, by providing variation in the lengths of the predetermined number of the metal flat-plates in the direction perpendicular to the direction in which the metal flat-plates are laminated, a predetermined notched engagement portion is formed in the laminated body coil at a contact portion where the end portion of the laminated body coil contacts the bus bar. By forming this engagement portion, the mountability of the bus bar is increased.

Figure 9:
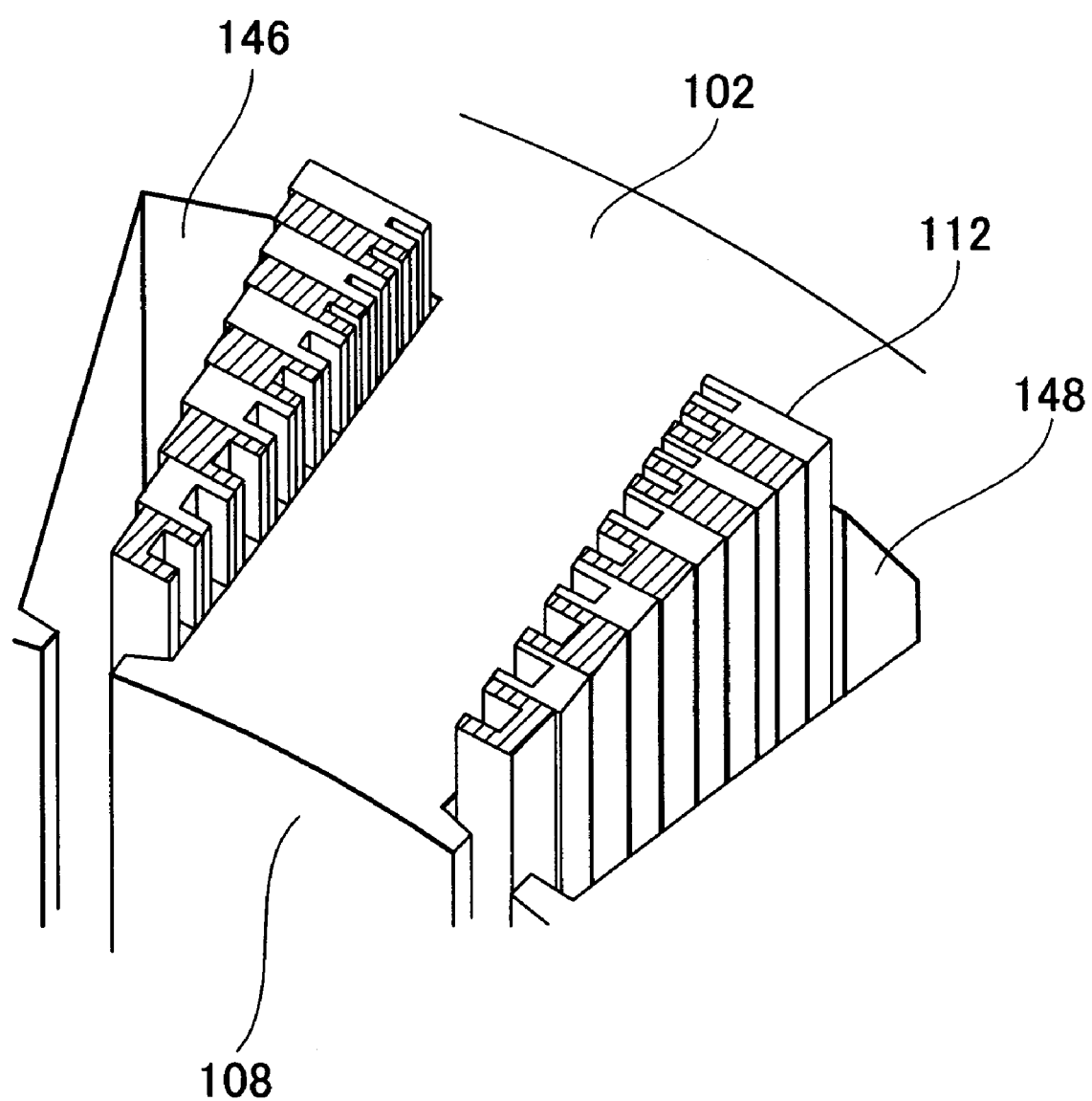
FIG. 9 is a view showing the coil fitted to the stator core, according to the first embodiment.

FIG. 9 shows the end portions of the coil 112, which are inserted into the slots 146 and 148, respectively. As shown in FIG. 9, the laminated body coils constituting the coil 112 have engagement portions having different shapes. More particularly, the cross sections of the end portions are different among the laminated body coils. By employing such a structure, erroneous fitting can be prevented when the bus bars are fitted to the laminated body coils. The shapes of the engagement portions can be made different by changing the number of the metal flat-plates constituting the laminated body coils, among the laminated body coils.

Figure 10:
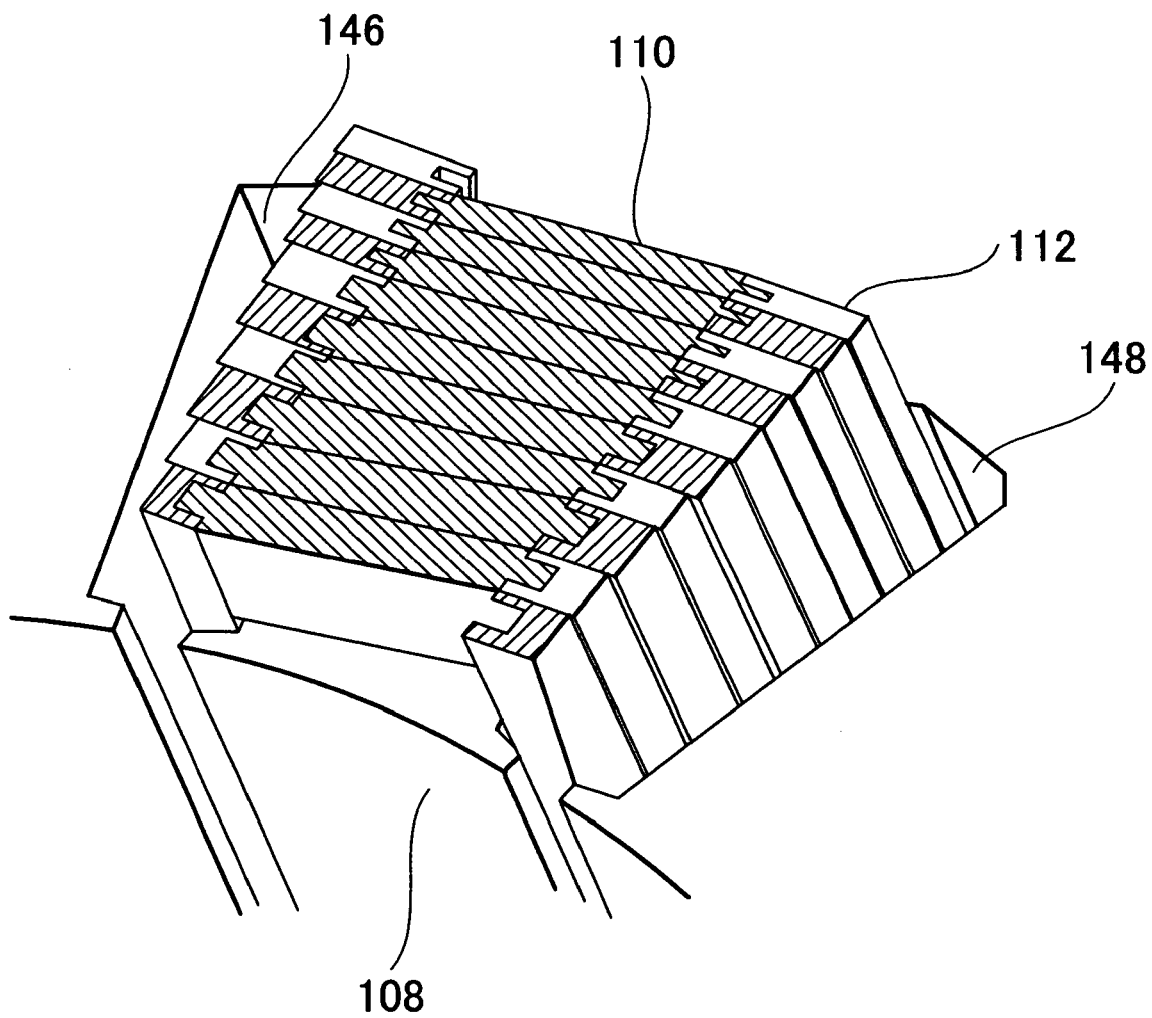
FIG. 10 is a view showing the coil with a bus bar fitted thereto, according to the first embodiment.

As shown in FIG. 10, when multiple bus bars corresponding to the engagement portions of the laminated body coils are fitted individually, at least, the shapes of the engagement portions in the end portions of the laminated body coils adjacent to each other are made different from each other. Thus, erroneous fitting of the bus bar can be prevented.

Figure 11:
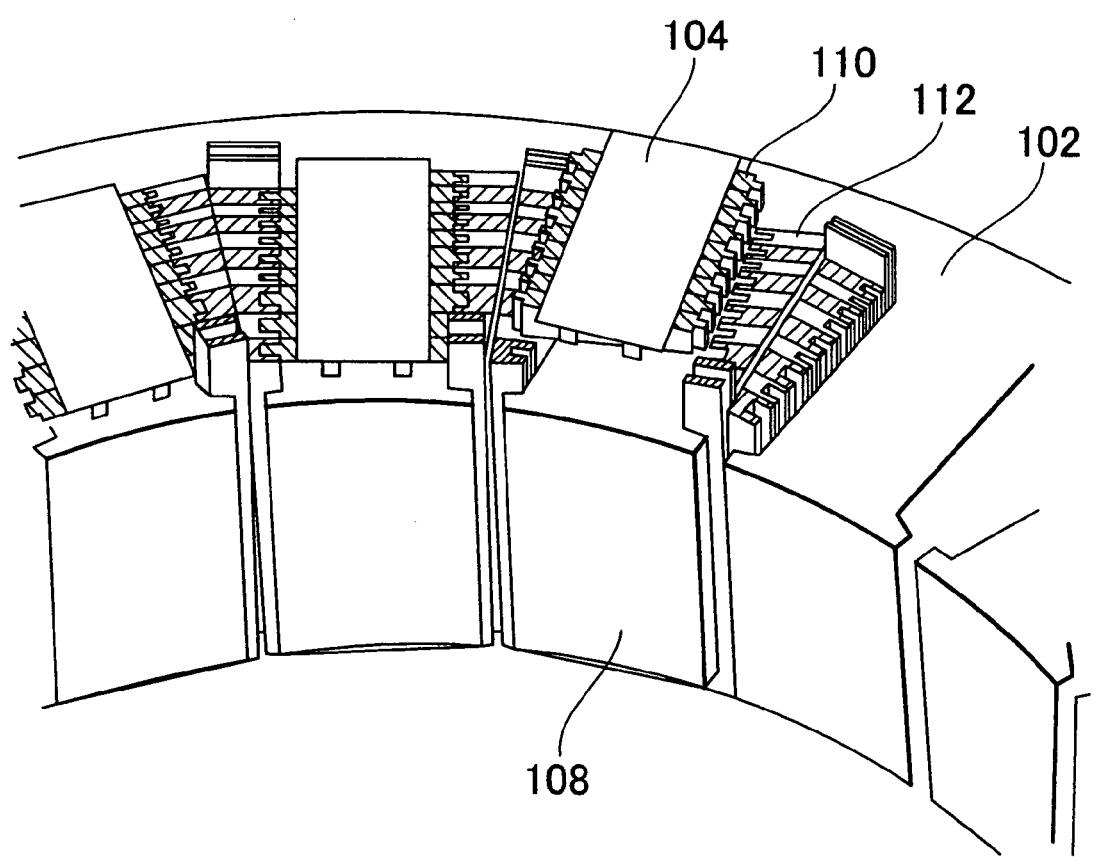
FIG. 11 is a view showing the coil with a bus bar positioning block fitted thereto, multiple bus bars being fitted to the bus bar positioning block, according to the first embodiment.

Particularly, as shown in FIG. 11, when multiple bus bars are simultaneously fitted to the laminated body coils using the positioning block 104 on which multiple bus bars are fixed, if at least one engagement portion in the end portions of the laminated body coils has a shape different from that of the other engagement portions, erroneous fitting can be prevented when the bus bars are fitted to the laminated body coils. In addition, since the positions, where the bus bars are connected to the laminated body coils, are identified, the bus bars are connected to the laminated body coils without using a positioning jig. In the embodiment, the shapes of the engagement portions in three laminated body coils on the inner peripheral side, the shapes of the engagement portions in the three laminated body coils at the center, and the shapes of the engagement portions in the four laminated body coils on the outer peripheral side are different from each other.

Figure 12:
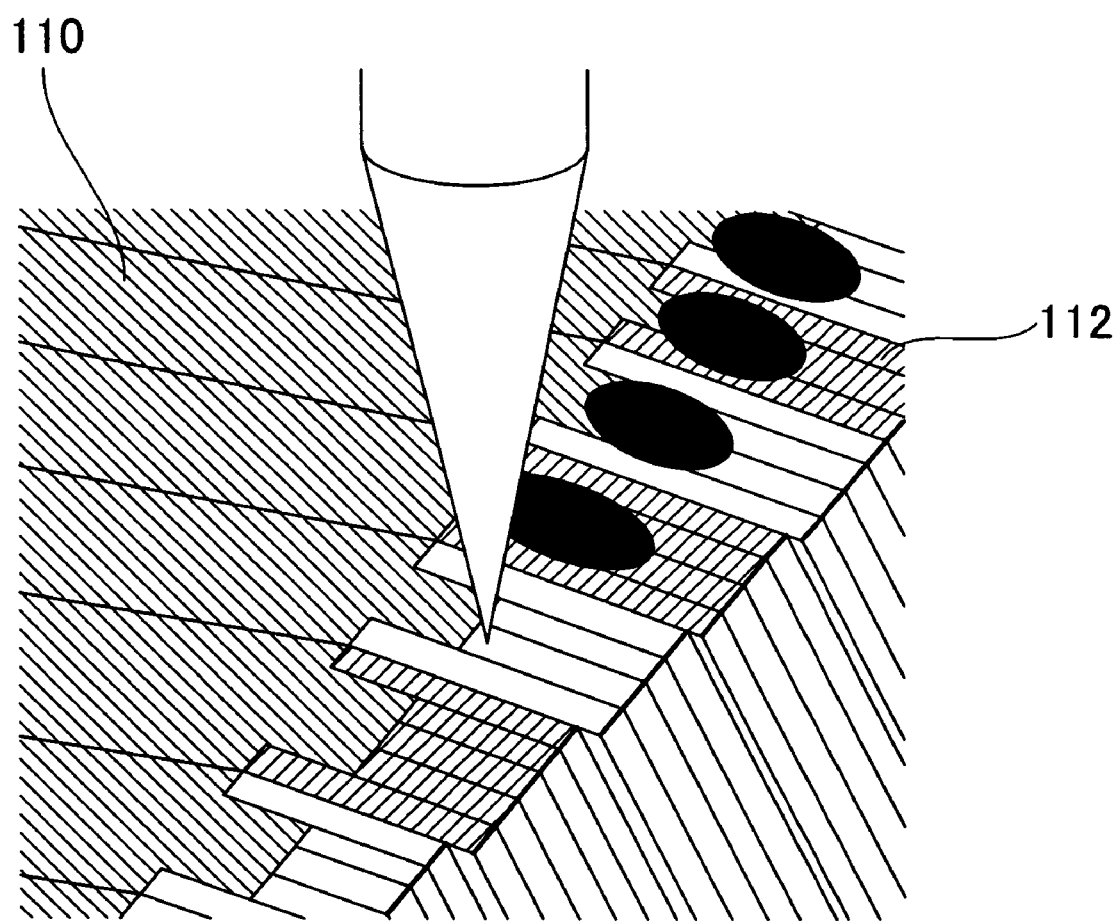
FIG. 12 is a view showing a joint between an end portion of the coil and the bus bar, according to the first embodiment.

As shown in FIG. 12, the bus bar fitted to the coil 112 is connected to the engagement portion in the end portion of each laminated body coil at multiple positions by laser welding, or TIG welding. The laser welding or TIG welding is performed at each of the multiple positions.

Figure 13:
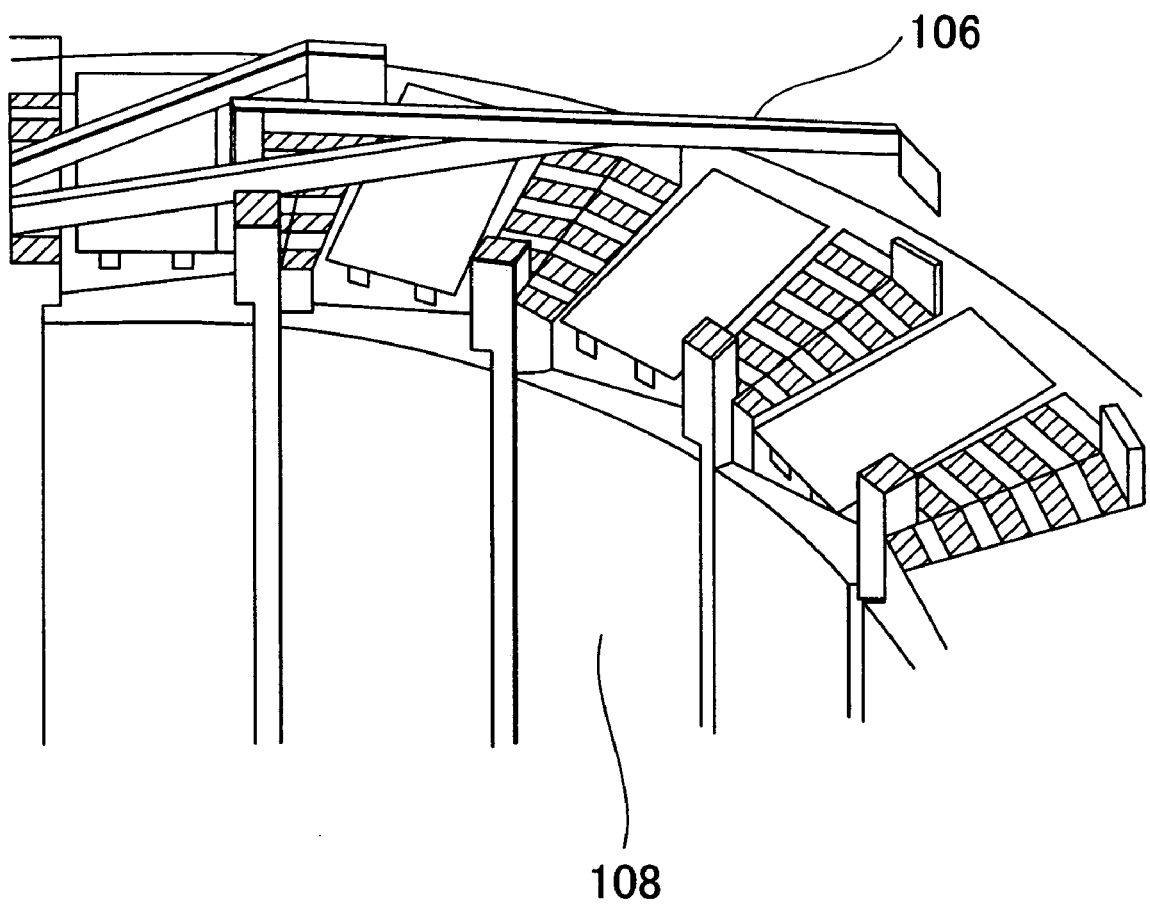
FIG. 13 is a view showing a procedure of fitting a crossover member to the terminal portion of the coil, according to the first embodiment.
Figure 14:
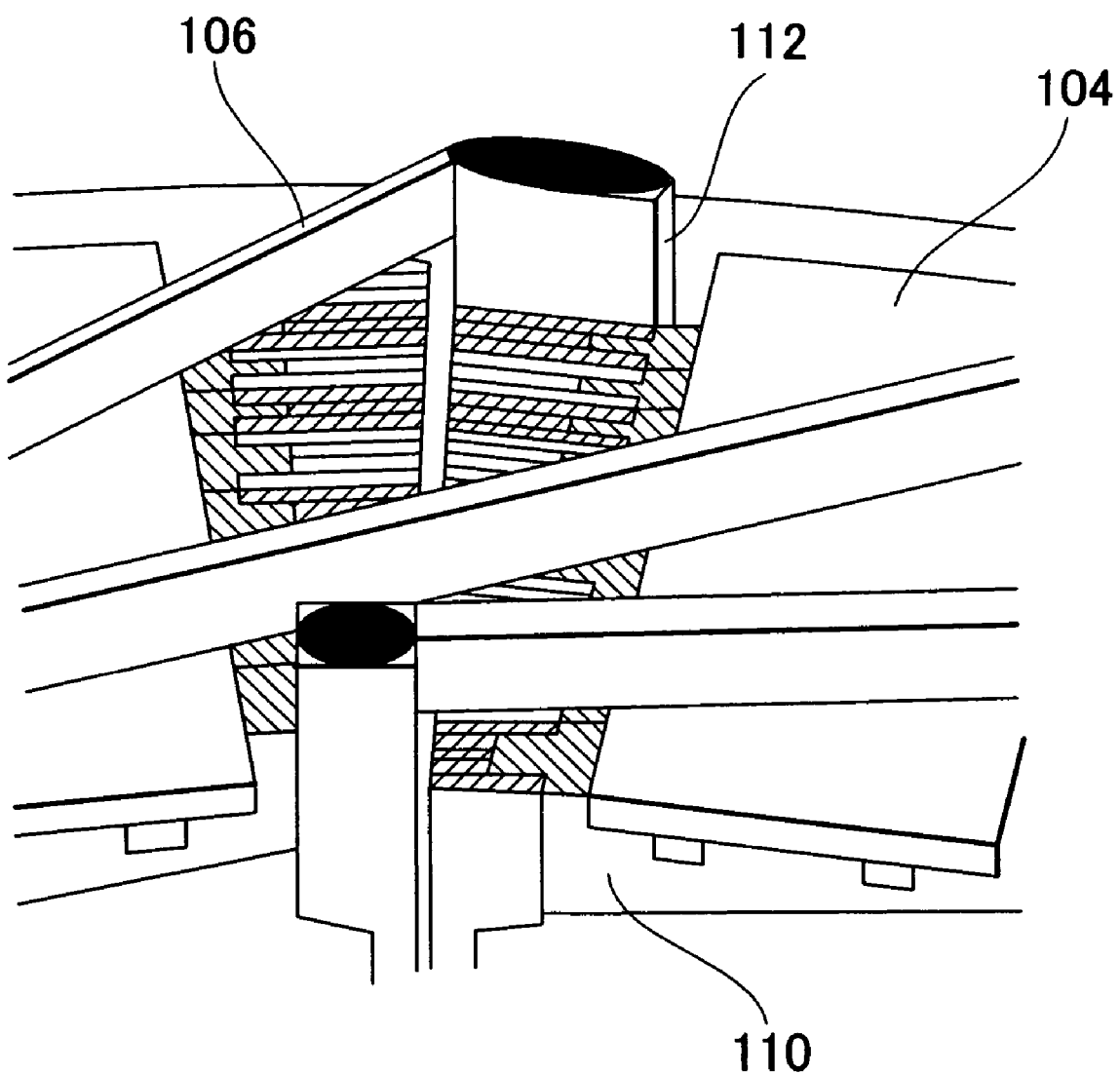
FIG. 14 is a view showing a joint between an end portion of the crossover member and the terminal portion of the coil, according to the first embodiment.
Figure 15:
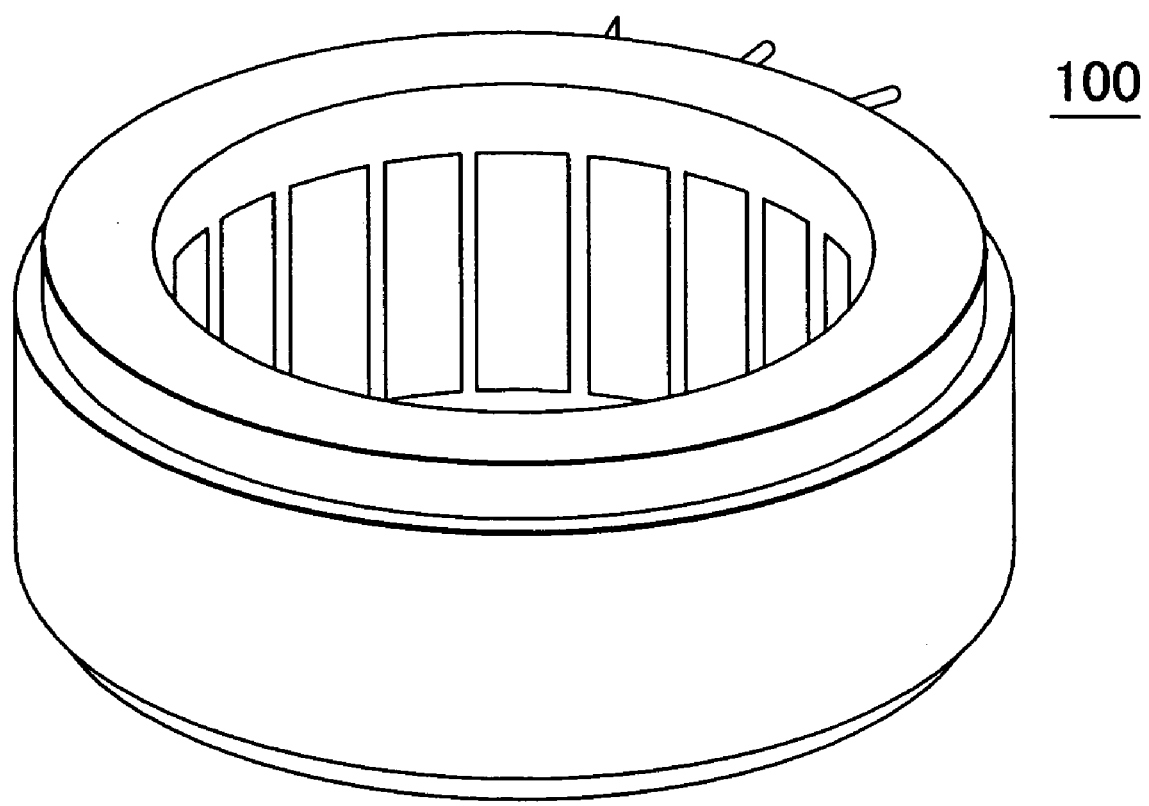
FIG. 15 is a view showing the stator in which a mold process is applied to the coil end portion, according to the first embodiment.

When the bus bars and the end portions of the laminated body coils are connected to each other, the coils, each of which is wound around a tooth, are connected to each other by the crossover member. Since the synchronous motor in the embodiment is a three phase alternating current synchronous motor, as shown in FIG. 13, the coil terminal portions on the outer peripheral side of the coils are connected to the coil terminal portions on the inner peripheral side of the coils by the crossover member for every three teeth. The coil 112 and the crossover member 106 are connected to each other by laser welding or TIG welding, as shown in FIG. 14. Thus, the stator 100 shown in FIG. 1 is formed. Then, a mold process is performed in the coil end portion using resin or the like, whereby the stator 100 shown in FIG. 15 is formed.

As described above, in the stator of a synchronous motor according to the embodiment, the laminated body coil is formed by laminating the predetermined number of the metal flat-plates made of rolled copper material, which are formed in the U-shape in the press process. The U-shaped laminated body coil can be fitted to the stator core in the direction parallel to the rotational axis so as to stride the tooth between the slots formed in the stator core. Then, the open end portion of the laminated body coil is closed, and the coil is formed. By employing such a structure, it is not necessary to reserve the space for the winding, which corresponds to the size of the nozzle used for nozzle direct winding. Therefore, the cross section of the laminated body coil to be inserted into the slot can be set freely. Namely, it is possible to set the cross section of the laminated body coil such that a higher proportion of the copper in the slot can be obtained. By obtaining higher proportion of the copper in the slot, a copper loss can be reduced. As a result, the efficiency of the synchronous motor can be increased. Accordingly, the sizes of the stator core and the coil end portion can be reduced.

Also, in the laminated body coil, by laminating multiple metal flat-plates on the surface each of which insulating coating is performed, an over-current loss can be reduced. An over-current loss "We" can be shown by "We=K (proportional constant)$\times t^2$ (thickness of the plate)". Namely, the over-current loss is likely to increase as the thickness of the metal flat-plate, through which an electric current flows, increases. Therefore, by applying insulating coating on the surface of the metal flat-plate and forming the laminated body coil by laminating the metal flat-plates, an electric current flows in each metal flat-plate whose thickness is small. As a result, an over-current loss is reduced. Also, an electric power loss due to leakage flux can be reduced by reducing the over-current loss. If the over-current loss is reduced, a voltage applied to the laminated body coil of each turn can be reduced. It is thus possible to provide the stator of a rotary electric machine, in which the proportion of the cross sectional area of the laminated body coil in the cross sectional area of the slot is high, and an electric power loss due to leakage flux is reduced.

Figure 16:
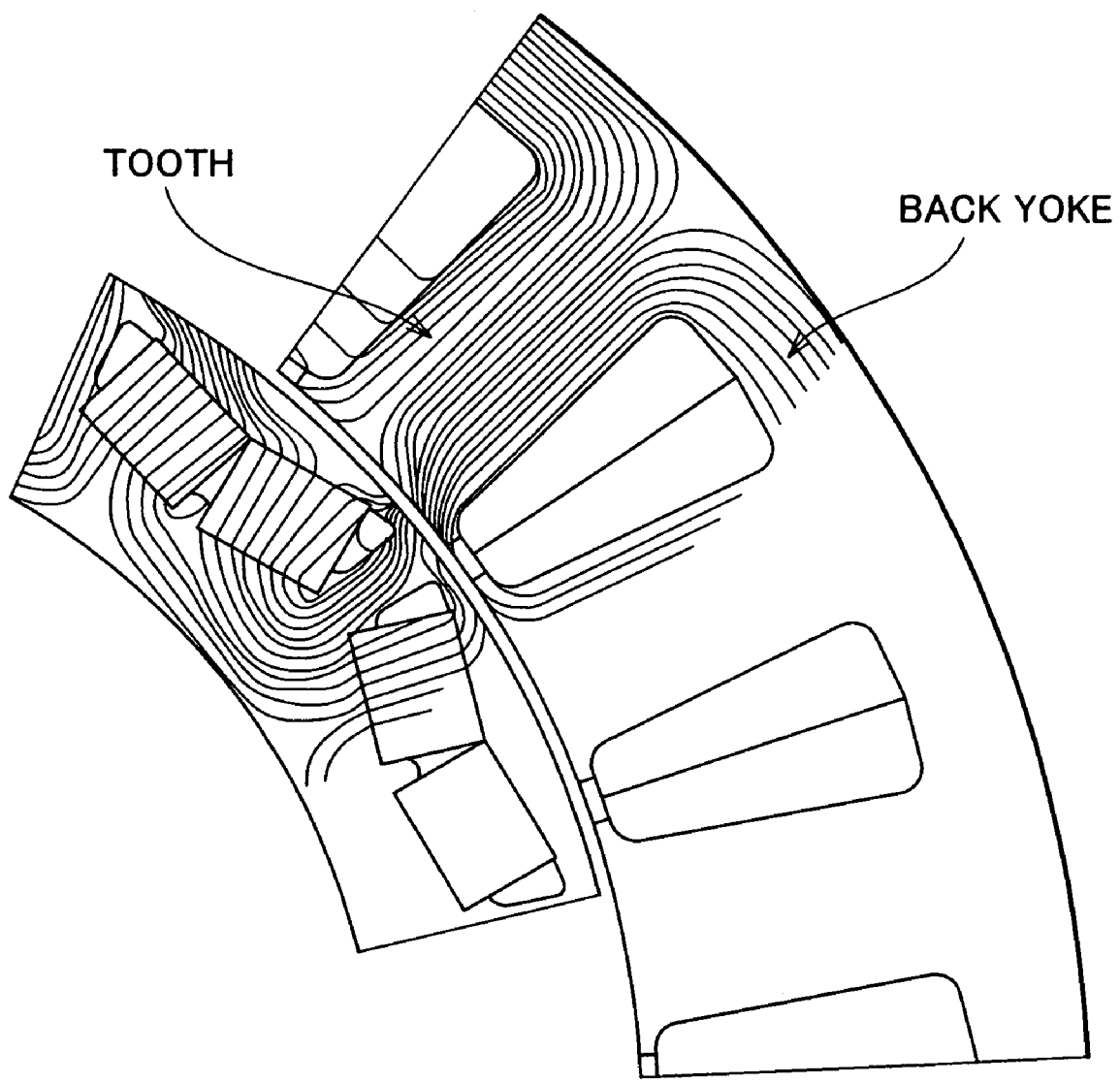
FIG. 16 is a view showing lines of magnetic flux generated when an alternating current is supplied to a synchronous motor, according to the first embodiment.

When an alternating current is supplied to the synchronous motor according to the embodiment with the phase thereof is controlled, a magnetic flux is generated. As shown in FIG. 16, when a high load is applied, a large amount of magnetism leaks from a back yoke, which is formed in the outer peripheral direction of the teeth and the slots, to the inside of the slots of the synchronous motor. According to the amount of the leakage flux, an over current is generated in the coil. The over current can be considerably reduced by forming the coil of the laminated body formed by laminating multiple metal flat-plates. Also, a leakage flux is generated in the direction perpendicular to the surface on which the tooth contacts the coil. Thus, the direction in which the metal flat-plates are laminated becomes perpendicular to the surface on which the tooth formed between the slots contacts the coil, and the leakage flux flows to each of the metal flat-plates constituting the laminated body. As a result, an over-current can be reduced.

When the actual number of poles is larger than the predetermined number, the area, at which the coil contacts the electromagnetic steel plate constituting the stator core, on the tooth side is much larger than that on the back yoke side. Also, in the motor in which a common copper wire is used, heat dissipated from the conductor near the center of the slot is transferred to the tooth and the back yoke through multiple enamel layers. Due to heat transfer through multiple enamel layers, heat conductivity is considerably reduced. However, in the embodiment, heat generated near the center of the slot can be transferred to a portion near the electromagnetic steel plate through the inside of the copper having high heat conductivity. As a result, the current density can be increased. As mentioned above, the area, at which the coil contacts the electromagnetic steel plate constituting the stator core, on the teeth side is much larger than that on the back yoke side. Therefore, it becomes easier to dissipate heat from the coil to the electromagnetic steel plate.

Figure 17A:
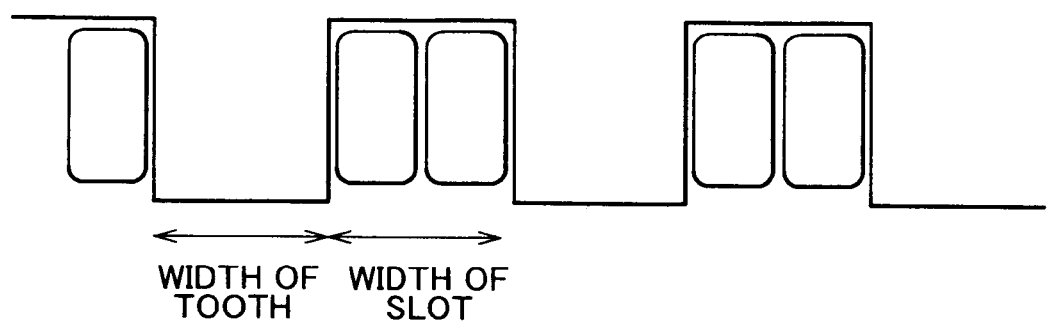
FIGS. 17A to 17C are views showing layouts when U-shaped metal flat-plates are pressed, according to the first embodiment.
Figure 17B:
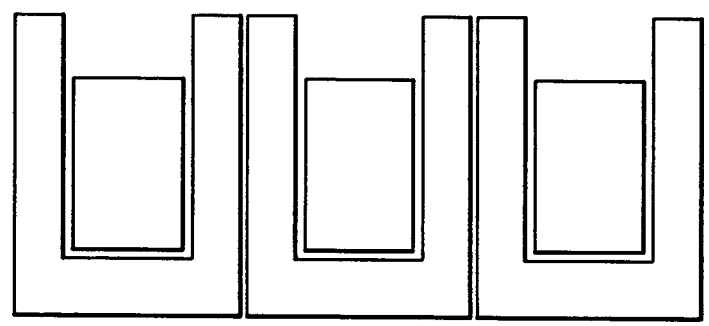
Figure 17C:
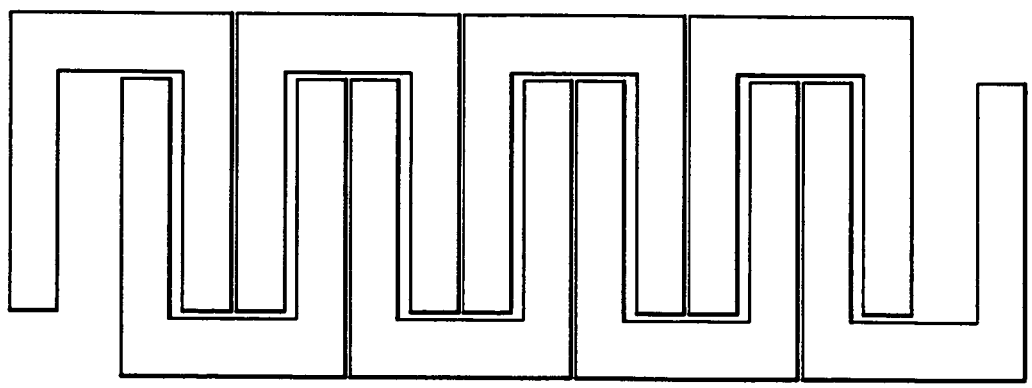

In the concentrated winding, as shown in FIGS. 17A and 17B, the proportion between width of the slot and the width of the tooth is "1:1". Therefore, in the press process for forming the U-shaped metal flat-plate, since the width of the slot is equal to the width of the tooth, as shown in FIG. 17C, the press process can be performed using a press die formed by closely combining the U-shaped members alternately. Thus, yields can be enhanced.

Hereafter, a structure of a stator of a rotary electric machine according to a second embodiment of the invention will be described. The structure of the stator of a rotary electric machine according to the embodiment is the same as the structure of the synchronous motor according to the first embodiment, except for the coil 112. The same reference numerals are assigned to the same elements. The names and functions of the elements having the same reference numerals are also the same. Therefore, concrete descriptions on the elements having the same reference numerals are not repeated here.

Figure 18B:
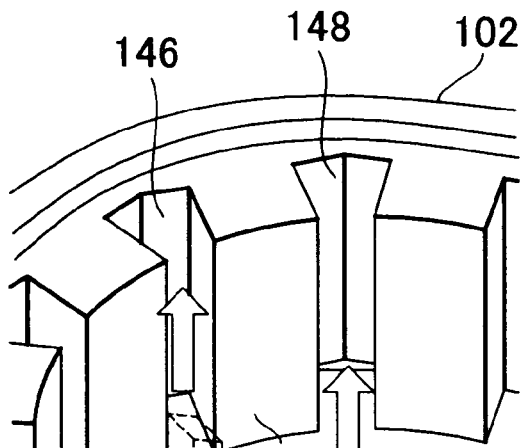
FIGS. 18A to 18C are views showing a procedure of fitting a U-shaped coil, in which a projection portion is formed, to the stator core, according to a second embodiment.
Figure 18A:
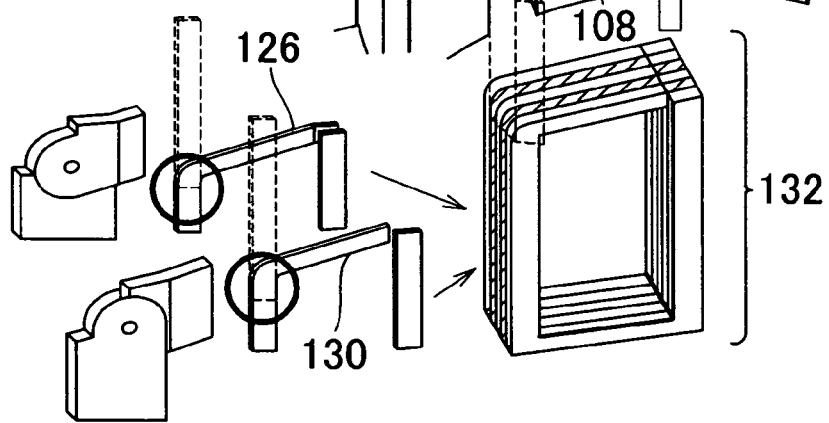
Figure 19:
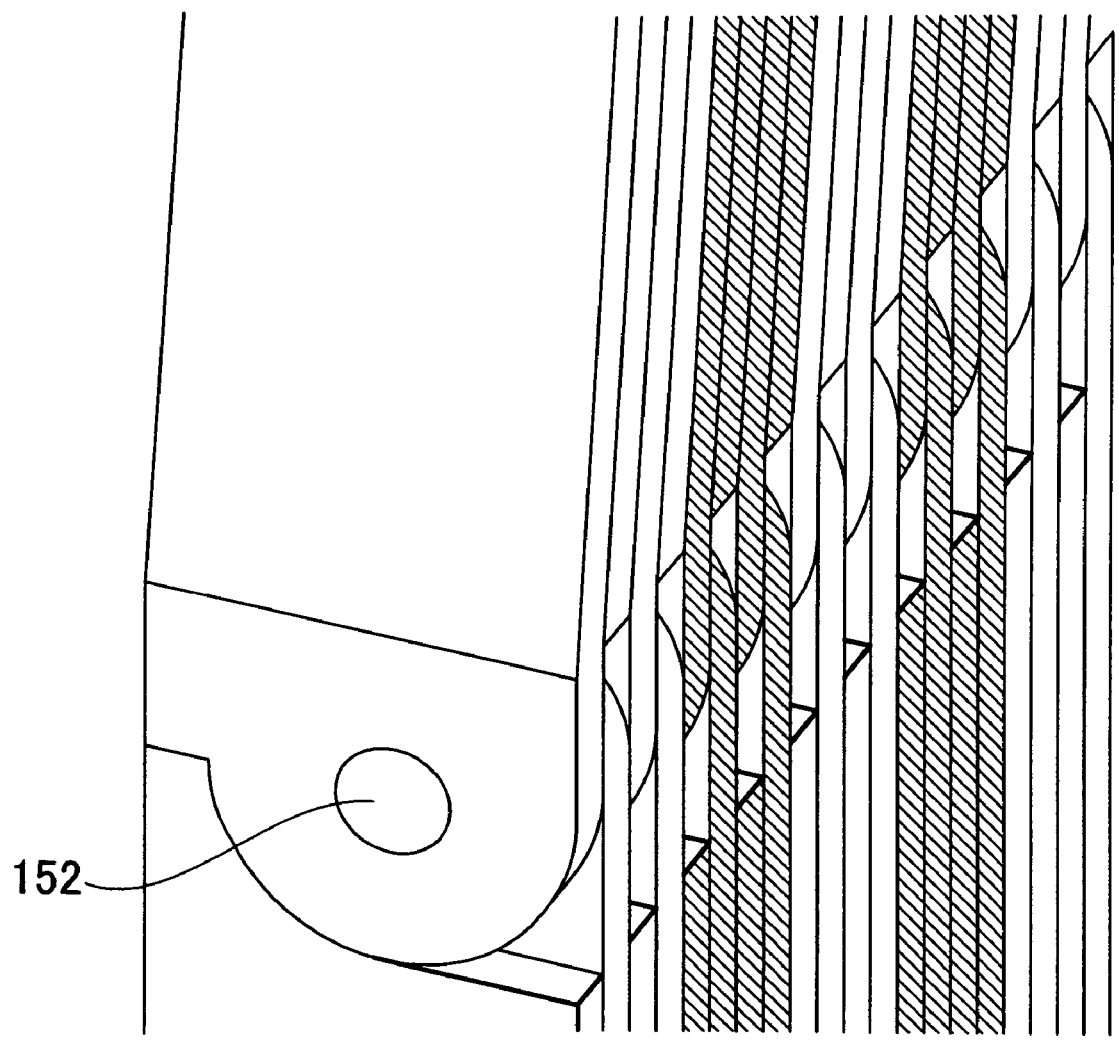
FIG. 19 is a view showing the projection portion in the coil, according to the second embodiment.

In a laminated body constituting a coil of the stator of the synchronous motor according to the embodiment, there are two members of the U-shaped laminated body coil, which are parallel to each other. The metal flat-plate corresponding to one of the two members is longer than the metal flat-plate corresponding to the other member in the direction of rotational axis. In the longer metal flat-plate (hereinafter, referred to as a "longer side"), as shown in FIGS. 18A and 19, a cylindrical projection portion, which is formed by combining a convex portion and a concave portion positioned on the opposite side of the concave portion, is provided at a position corresponding to the position of the end portion of the shorter metal flat-plate (hereinafter, referred to as a "shorter side"). The metal flat-plate is formed so as to be bendable at the projection portion. It is possible to bend the longer side using the projection portion as a pivot. In this case, the length of the longer side is set such that the longer side contacts the shorter side of the adjacent laminated body coil when the longer side is bent using the projection portion as a pivot.

As shown in FIG. 18A, each of laminated body coils 128 and 130 are formed by laminating a predetermined number of the metal flat-plates. Lamination is realized by pressing a convex portion of a metal flat-plate into a concave portion of another metal flat-plate. In addition, as shown in FIG. 18B, a coil 132 is formed by laminating a predetermined number of these laminated body coils. Between the laminated body coils, an insulating member is provided. The insulating member adheres to the laminated body coils. The coil 132 is inserted into the slots 146 and 148 so as to stride the tooth 108 of the stator core 102 in the direction of the rotational axis of the synchronous motor.

Figure 18C:
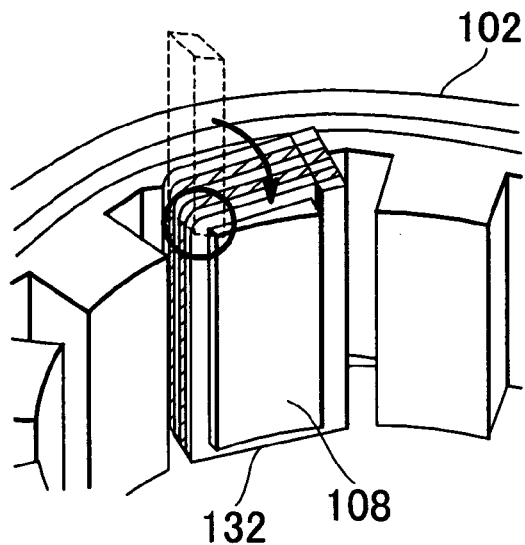

As shown in FIG. 18C, the longer side of the U-shaped laminated body coil is bent so as to contact the end portion of the shorter side of the adjacent laminated body coil, using the projection portion as a pivot. Similarly, the longer side of each laminated body coil is bent so as to contact the end portion of the shorter side of the adjacent laminated body coil, using the projection portion as a pivot. Thus, the coil 132 having a predetermined number of turns, which is wound around the tooth 108, is formed. The predetermined number of turns is not particularly limited. In the embodiment, the number of turns is, for example, five.

As described above, with the stator of the synchronous motor according to the embodiment, the projection portion, which is bendably formed by combining the convex portion and the concave portion, is provided in the longer member of the metal flat-plate from among the two members parallel to each other. Accordingly, by inserting the laminated body coil into the stator core and then bending the longer side of the laminated body coil such that the longer side contacts the shorter side of the adjacent laminated body coil using the projection portion as a pivot, it is possible to connect the laminated body coils to each other by each turn. Since the projection portion has high accuracy of positional, it becomes easier to obtain accuracy of positioning of the connection portion before welding.

Hereafter, a stator of a rotary electric machine according to a modified example of the second embodiment will be described. The structure of the stator of a rotary electric machine according to the modified example is the same as the structure of the synchronous motor according to the first embodiment except for the coil 132. The same reference numerals are assigned to the same elements. The names and functions of the elements having the same reference numerals are also the same. Therefore, concrete descriptions on the elements having the same reference numerals are not repeated here.

Figure 20:
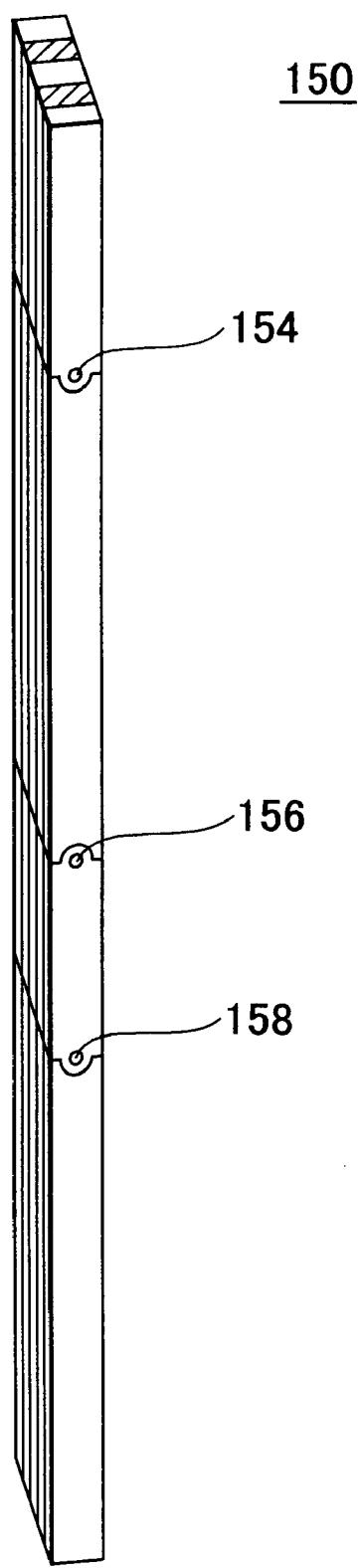
FIG. 20 is a view showing a coil having three projection portions, according to a modified example of the second embodiment.

As shown in FIG. 20, a coil 150 of a stator of a synchronous motor according to the modified example is formed by laminating a predetermined number of laminated body coils. The laminated body coil is formed by laminating a predetermined number of metal flat-plates each of which has a projection portion formed of a convex portion and a concave portion. The laminated body coil has at least three portions which are bendably formed. Also, an insulating member is provided between the laminated body coils, and the insulating member adheres to the laminated body coils. The method of forming the portion which is bendably formed is not particularly limited to combining the convex portion and the concave portion. In the embodiment, the portion which is bendably formed is realized by pressing the convex portion of a projection portion to the concave portion of the projection portion of another metal flat-plate. By bending the two portions adjacent to each other from among the three portions, the coil 150 is formed in the U-shape.

Figure 21:
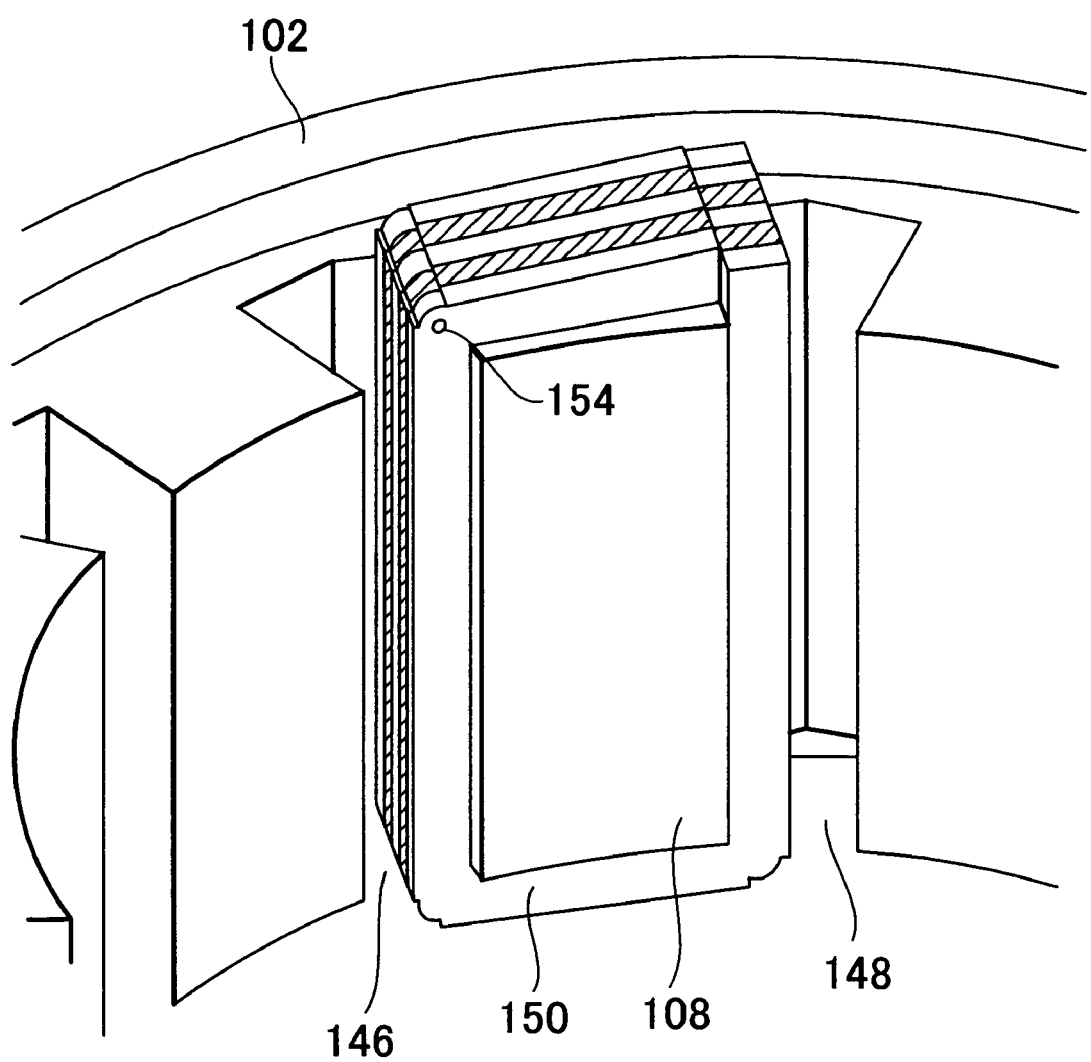
FIG. 21 is a view showing the coil which is fitted to the stator core, according to the modified example of the second embodiment.
Figure 22:
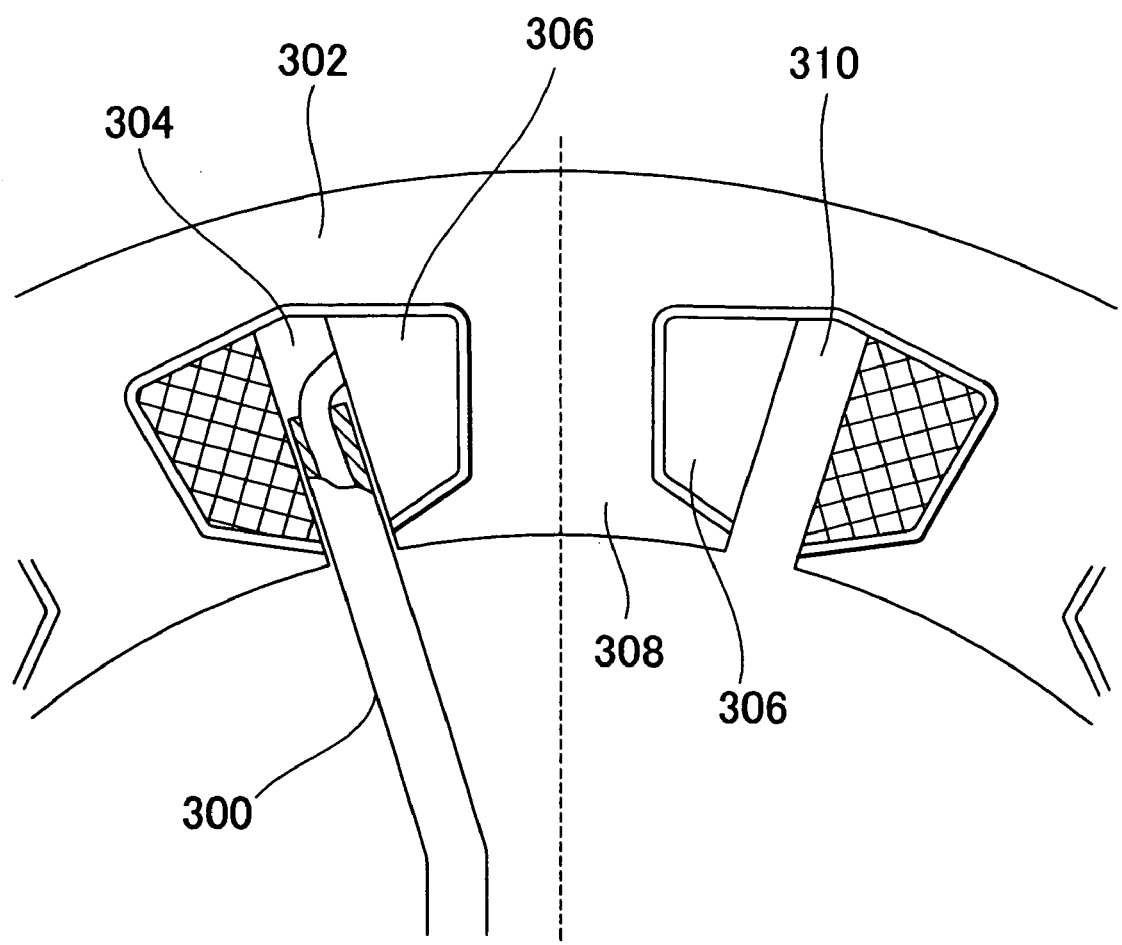
FIG. 22 is a view for describing conventional winding of a coil around a tooth by nozzle direct winding.

The coil 150 according to the modified example includes three projection portions 154, 156 and 158. The coil 150 is formed in the U-shape when the coil 150 is bent using the two projection portions 156 and 158 as pivots from among the three portions. The coil 150 formed in the U-shape is inserted into the slots 146 and 148 so as to stride the tooth 108 in the direction of the rotational axis of the synchronous motor. As shown in FIG. 21, in the coil 150, the laminated body coil is bent so as to contact the end portion of the adjacent laminated body coil using the projection portion 154 as a pivot. By connecting the end portion of the bent laminated body coil to the end portion of the adjacent laminated body coil, the coil 150 having a predetermined number of turns, which is wound around the tooth 108, is formed. The predetermined number of turns is not particularly limited. In the modified example, the predetermined number of turns is, for example, five.

The positions of the three projection portions are set to the positions at which the laminated body coil contacts the surface of the tooth when the laminated body coil is bent. Also, the length of the straight coil 150 is set such that, when the coil 150 is wound around the tooth 108, the end portion of the laminated body coil contacts the end portion of the adjacent laminated body coil in the coil 150.

In the stator of the synchronous motor according to the modified example, the three bendable portions (for example, the projection portions), each of which is formed by combining the convex portion and the concave portion, are provided in the straight laminated body coil. In this case, by bending the laminated body coil at the right angle using the two projection portions adjacent to each other from among the three portions as pivots, a U-shaped laminated body coil can be obtained which has the two members parallel to each other and the connection end portion that connects the two members to each other. After the U-shaped laminated body coil is inserted into the slots formed in the stator core, the laminated body coil is bent using the remaining one projection portion as a pivot such that the end portions of the laminated body coil contact each other, whereby connecting by each turn is realized. In addition, in the press process, the three projection portions are formed in the straight laminated body coil. Thus, the yield at the press process is enhanced. Since the projection portion has high accuracy of positional, it becomes easier to obtain accuracy of positioning of the connection portion before welding.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A stator of a rotary electric machine, comprising:
a stator core having multiple slots in a direction parallel to a rotational axis of the rotary electric machine; and
a laminated flat-plate conductor formed by laminating a predetermined number of one-piece flat-plate conductors each of which has a closed end portion and an open end that opens such that the flat-plate conductor can be fitted to the stator core, wherein the laminated flat-plate conductor is inserted into the slots of the stator core and the open end is closed, whereby a coil is formed,
wherein the flat-plate conductor has two sides parallel to each other, and the closed end portion between the two sides,
wherein the flat-plate conductor forms a coil end, and a cross sectional area of the coil end is larger than a cross sectional area of a portion of the flat-plate conductor, which is to be inserted into the slot, the cross sectional area of the coil end being parallel to the two sides of the flat plate conductor, and the cross sectional area of a portion of the flat-plate conductor which is to be inserted into the slot being perpendicular to the sides of the flat-plate conductor,
wherein each surface of the coil end is substantially flat, and
wherein the coil end is substantially perpendicular to the two sides.

2. The stator of a rotary electric machine according to claim 1, wherein the coil end contacts the stator core.

3. The stator of a rotary electric machine according to claim 2, wherein a width of the slot is equal to a width of a tooth portion which is formed between the slots.

4. The stator of a rotary electric machine according to claim 3, wherein the flat-plate is formed by press process, and the press process is performed using a press die formed by closely combining the flat-plates alternately.

5. The stator of a rotary electric machine according to claim 1, wherein the laminated flat-plate conductor is formed by laminating the predetermined number of the flat-plate conductors on a surface each of which insulating coating is performed.

6. The stator of a rotary electric machine according to claim 1, wherein the laminated flat-plate conductor is formed by fixing the flat-plate conductors to each other by lamination caulking.

7. The stator of a rotary electric machine according to claim 1, wherein the coil is formed by laminating multiple laminated flat-plate conductors, and cross sections of end portions of the laminated flat-plate conductors are different at least between the adjacent laminated flat-plate conductors.

8. The stator of a rotary electric machine according to claim 7, wherein the flat-plate conductor has a notch in the opened end such that the cross sections of the laminated flat-plate conductors are different.

9. The stator of a rotary electric machine according to claim 1, wherein the laminated flat-plate conductor has a portion which is bendably formed.

10. The stator of a rotary electric machine according to claim 9, wherein the flat-plate conductor has a projection portion formed by combining a convex portion and a concave portion, and the bendably formed portion uses the projection portion as a pivot.

11. The stator of a rotary electric machine according to claim 9, wherein at least three bendably formed portions are provided.

12. The stator of a rotary electric machine according to claim 1, wherein a direction in which the laminated flat-plate conductors are laminated is perpendicular to a surface which contacts a tooth portion formed between the slots.

13. The stator of a rotary electric machine according to claim 1, wherein the flat-plate conductor is made of rolled copper material.

* * * * *

UNITED STATES PATENT AND TRADEMARK OFFICE
CERTIFICATE OF CORRECTION

PATENT NO. : 7,268,456 B2
APPLICATION NO. : 10/988694
DATED : September 11, 2007
INVENTOR(S) : Kenji Harada et al.

It is certified that error appears in the above-identified patent and that said Letters Patent is hereby corrected as shown below:

| <u>Column</u> | <u>Line</u> | |
|---|---|---|
| 6 | 41 | Change "respective" to --respectively.--. |
| 8 | 26 | Change "and "Abx" to --and Ab=--. |

Signed and Sealed this

Twenty-ninth Day of April, 2008

JON W. DUDAS
*Director of the United States Patent and Trademark Office*